US 10,557,916 B2

(12) United States Patent
Hafizovic et al.

(10) Patent No.: US 10,557,916 B2
(45) Date of Patent: Feb. 11, 2020

(54) UAV DETECTION

(71) Applicant: Squarehead Technology AS, Nydalen, Oslo (NO)

(72) Inventors: Ines Hafizovic, Oslo (NO); Stig Oluf Nyvold, Oslo (NO); Jon Petter Helgesen, Oslo (NO); Johannes Alming Daleng, Oslo (NO); Frode Berg Olsen, Oslo (NO)

(73) Assignee: SQUAREHEAD TECHNOLOGY AS, Naydalen, Oslo (NO)

( * ) Notice: Subject to any disclaimer, the term of this patent is extended or adjusted under 35 U.S.C. 154(b) by 0 days.

(21) Appl. No.: 15/773,899

(22) PCT Filed: Nov. 7, 2016

(86) PCT No.: PCT/GB2016/053482
§ 371 (c)(1),
(2) Date: May 4, 2018

(87) PCT Pub. No.: WO2017/077348
PCT Pub. Date: May 11, 2017

(65) Prior Publication Data
US 2018/0329020 A1 Nov. 15, 2018

(30) Foreign Application Priority Data
Nov. 6, 2015 (GB) .................................. 1519634.8

(51) Int. Cl.
*G10L 15/02* (2006.01)
*G01S 5/02* (2010.01)
(Continued)

(52) U.S. Cl.
CPC .............. *G01S 5/0263* (2013.01); *G01S 5/20* (2013.01); *G06K 9/00771* (2013.01);
(Continued)

(58) Field of Classification Search
CPC ......... G01S 5/0263; G10L 15/02; F41H 11/00
See application file for complete search history.

(56) References Cited

U.S. PATENT DOCUMENTS 5,970,024 A * 10/1999 Smith .................... F41H 11/00
367/128
2002/0010578 A1 * 1/2002 Padmanabhan ......... G10L 15/02
704/231

FOREIGN PATENT DOCUMENTS

EP          1643769 A1     5/2006
EP          1643769    *   6/2006    ............... H04N 7/15
(Continued)

OTHER PUBLICATIONS

Busset et al., Proceedings of SPIE, vol. 9647, Oct. 13, 2015, p. 96470F-1-p. 96470F-8.*

(Continued)

*Primary Examiner* — Myron Wyche
(74) *Attorney, Agent, or Firm* — George S. Blasiak, Esq.; Heslin Rothenberg Farley & Mesiti P.C.

(57) ABSTRACT

A system for detecting, classifying and tracking unmanned aerial vehicles (UAVs) comprising: at least one microphone array arranged to provide audio data; at least one camera arranged to provide video data; and at least one processor arranged to generate a spatial detection probability map comprising a set of spatial cells. The processor assigns a probability score to each cell as a function of: an audio analysis score generated by comparing audio data to a library of audio signatures; an audio intensity score generated by evaluating a power of at least a portion of a spectrum of the audio data; and a video analysis score generated by using an image processing algorithm to analyse the video data. The system is arranged to indicate that a UAV has been detected in one or more spatial cells if the associated (Continued)

probability score exceeds a predetermined detection threshold.

33 Claims, 17 Drawing Sheets

(51) Int. Cl.
    *G01S 5/20*     (2006.01)
    *G06K 9/00*     (2006.01)
    *G06K 9/32*     (2006.01)
    *G06T 7/73*     (2017.01)
    *G06K 9/62*     (2006.01)

(52) U.S. Cl.
    CPC ......... *G06K 9/3216* (2013.01); *G06K 9/6277* (2013.01); *G06T 7/73* (2017.01); *G06T 2207/10012* (2013.01); *G06T 2207/10021* (2013.01); *G06T 2207/30232* (2013.01)

(56) References Cited

FOREIGN PATENT DOCUMENTS

| GB | 2103341 | A | 2/1983 | |
| GB | 2103341 | * | 8/1991 | ............... F41G 3/00 |
| GB | 2546140 | A | 12/2017 | |
| WO | WO 2014203593 | A1 | 12/2014 | |
| WO | WO 2016148825 | A1 | 9/2016 | |
| WO | WO 2017077348 | A1 | 5/2017 | |

OTHER PUBLICATIONS

Vasquez et al., Proceeding of SPIE, vol. 6971, Mar. 24, 2008, p. 6971-1-pg. 6971-11.*

J. Vasquez, et al. "*Multisensor 3D Tracking for Counter Small Unmanned Air Vehicles (CSUAV)*" Society of Photo Optical Instrumentation Engineers, 2008.

J. Busset, et al. "*Detection and tracking of Drones Using Advanced Acoustic Cameras*" Proc. of SPIE, vol. 9647, 96470F, CCC Code 0277-786X/15, DOI 10.1117/12.2194309, 2015.

International Search Report and Written Opinion of the International Searching Authority for PCT/GB2016/053482 filed Nov. 7, 2016, dated Feb. 8, 2017.

R. Mitchell, "*Specification Based Intrusion Detection for Unmanned Aircraft Systems*" Proceedings of the First ACM Mobihoc Workshop on Airborne Networks and Communications—Airborne '12, pp. 31-35, 978-1-4503-1290, Jun. 11, 2012.

Office action, Colombian file No. NC2018/0005561, filed May 25, 2018, Official Letter No. 1708, dated Apr. 29, 2019.

* cited by examiner

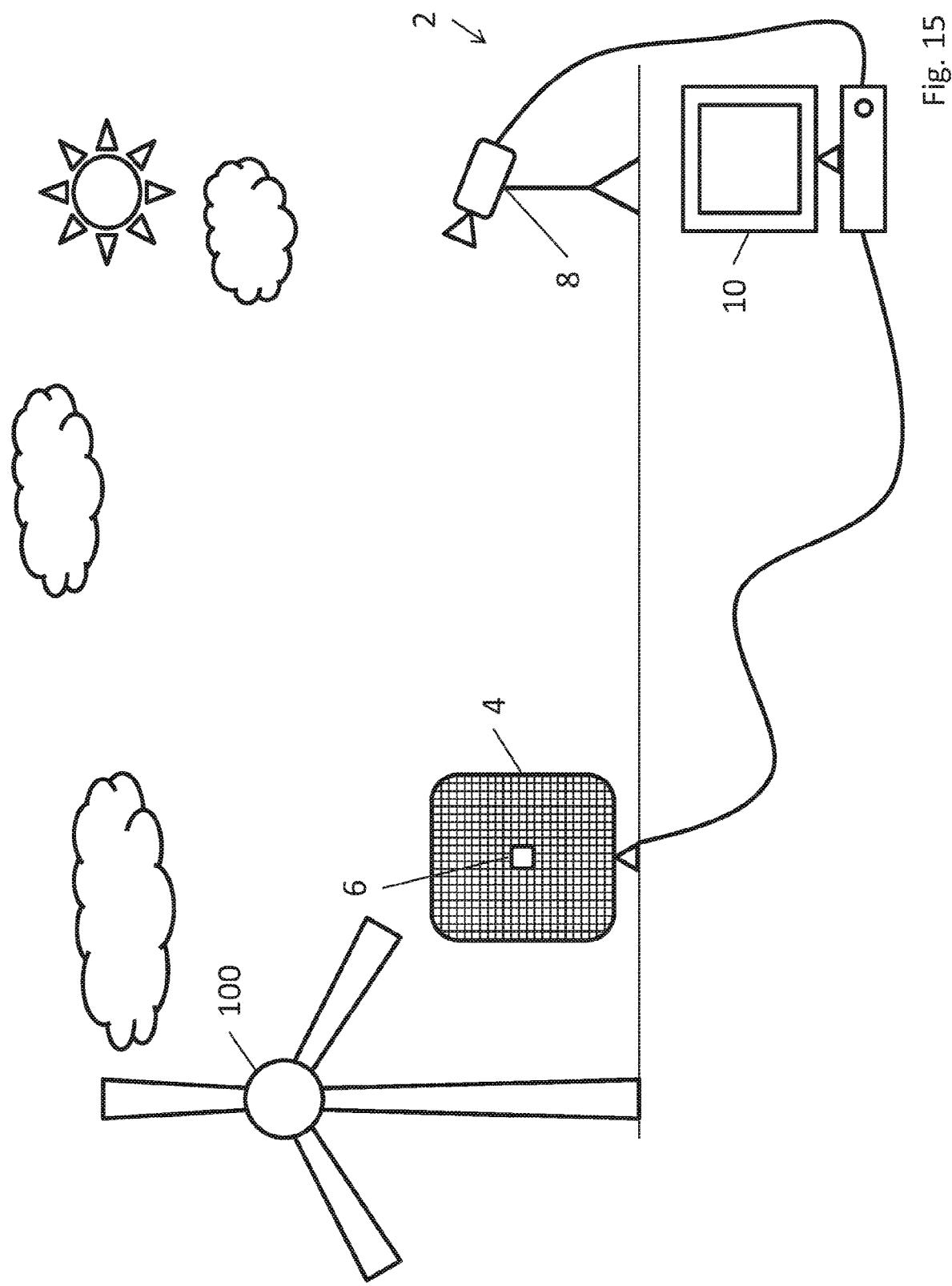

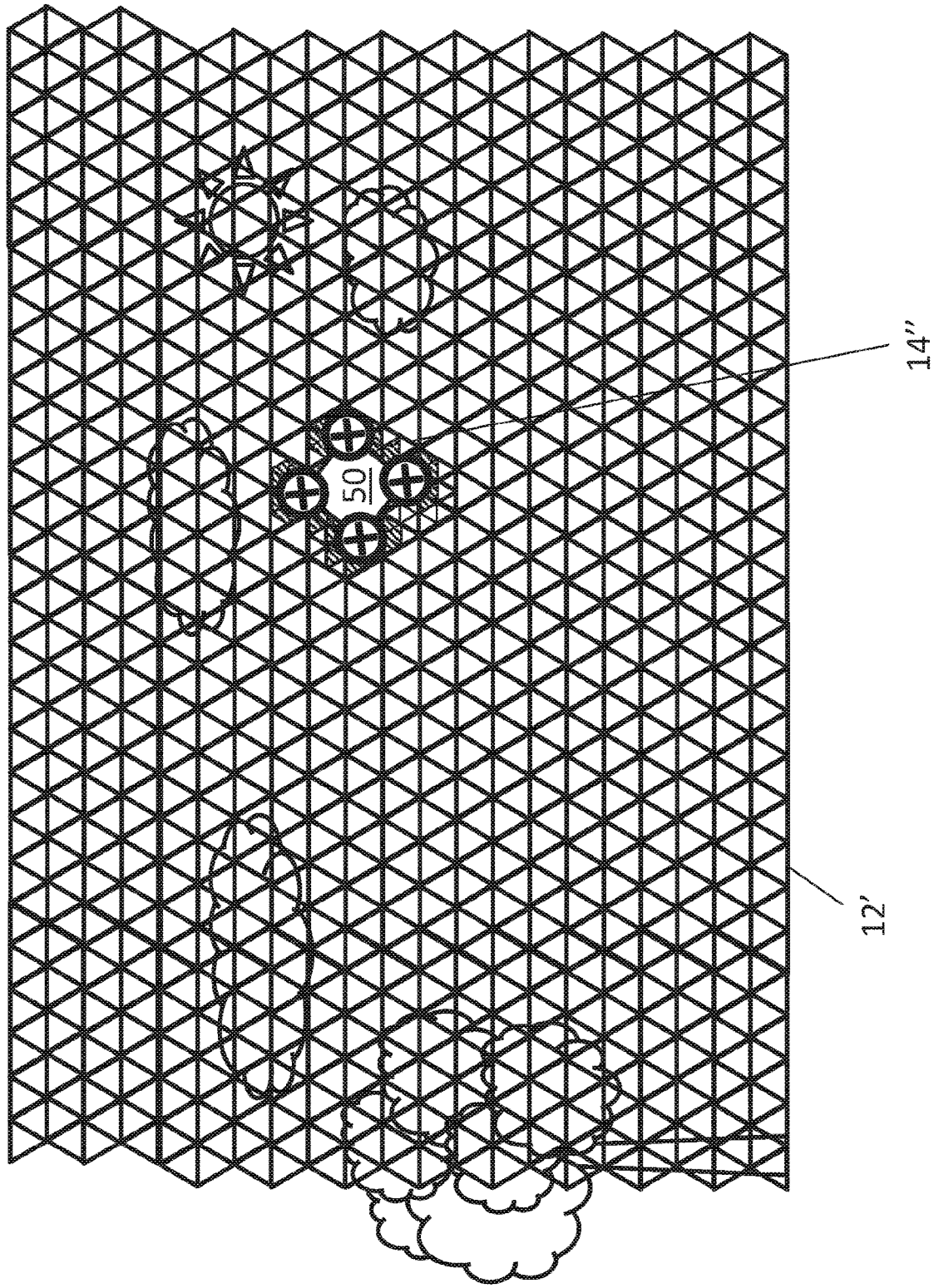

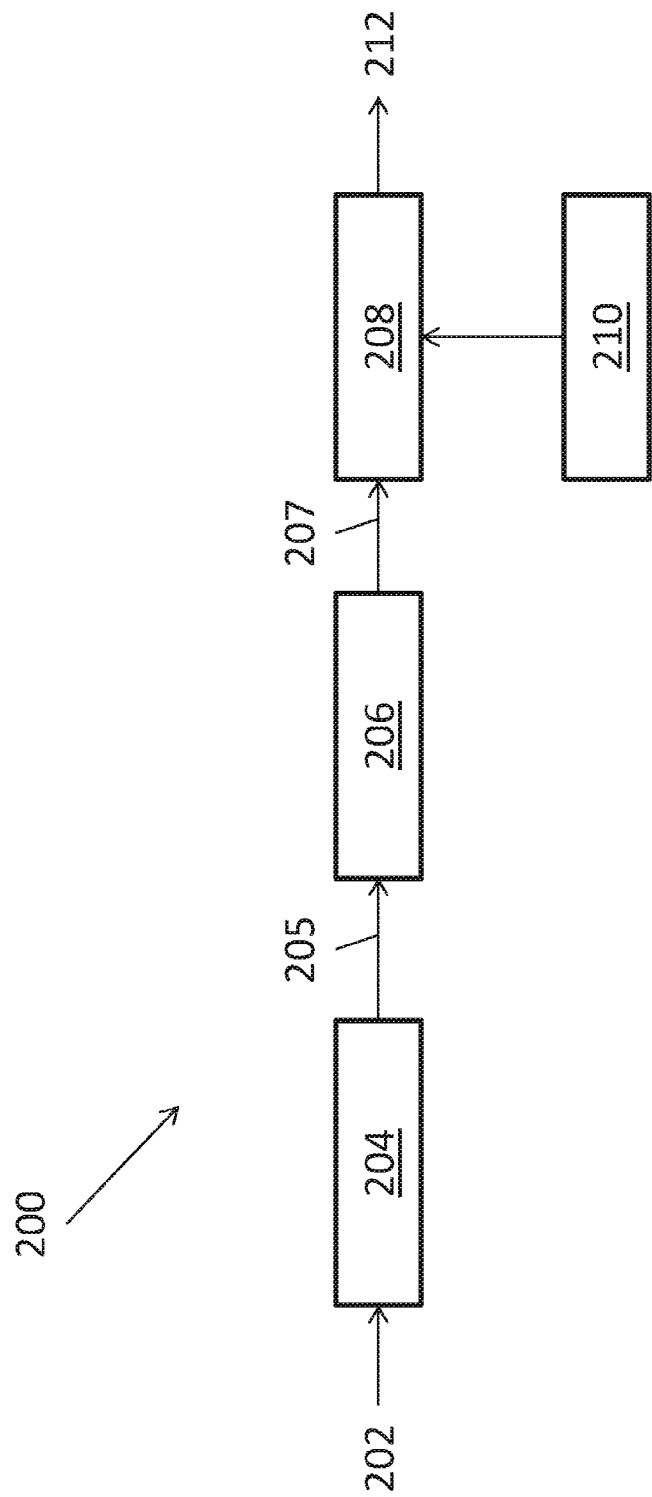

UAV DETECTION

CROSS REFERENCE TO RELATED APPLICATIONS

This application is a National Stage application under 35 U.S.C. § 371 of PCT Application No. PCT/GB2016/053482, filed Nov. 7, 2016, entitled "UAV DETECTION", which is incorporated herein by reference in its entirety, which claims priority to GB Application No. 1519634.8, filed Nov. 6, 2015, entitled "UAV DETECTION", which is incorporated herein by reference in its entirety.

FIELD

The present invention relates to the detection of unmanned aerial vehicles within a zone of interest using both audio and video data.

BACKGROUND

In recent years there has been a great deal of research and development into unmanned aerial vehicles (UAVs), commonly referred to as "drones". These drones are typically but not always small quadcopters i.e. a multirotor helicopter that is lifted and propelled by four rotors. However, it is becoming increasingly apparent that these drones potentially pose a threat, both to the privacy and security of the public.

Drones such as those described above can be readily purchased at a wide variety of high street electronics retailers, as well as via the Internet, with little to no scrutiny from the authorities. There has been much discussion regarding the fact that these drones could be used for nefarious purposes, for example being used to carry explosive, biological or radioactive material. There are also privacy concerns, given that these drones may be equipped with surveillance equipment such as cameras and/or microphones that may be used to spy on members of the public or private establishments.

Moreover, these drones are often very small and typically flown at such a low altitude that conventional aircraft detection systems are unable to locate them. The Applicant has appreciated that it would be highly beneficial to detect, classify and track such unmanned aerial vehicles.

BRIEF DESCRIPTION

When viewed from a first aspect, the present invention provides a system for detecting, classifying and tracking unmanned aerial vehicles in a zone of interest, the system comprising: at least one microphone array including a plurality of microphones, the at least one microphone array being arranged to provide audio data; at least one camera arranged to provide video data; and at least one processor arranged to process the audio data and the video data to generate a spatial detection probability map comprising a set of spatial cells, wherein the processor assigns a probability score to each cell within the set of spatial cells, said probability score being a function of: an audio analysis score generated by an audio analysis algorithm, said audio analysis algorithm comprising comparing the audio data corresponding to the spatial cell to a library of audio signatures; an audio intensity score generated by evaluating an amplitude of at least a portion of a spectrum of the audio data corresponding to the spatial cell; and a video analysis score generated by using an image processing algorithm to analyse the video data corresponding to the spatial cell, wherein the system is arranged to indicate that an unmanned aerial vehicle has been detected in one or more spatial cells within the zone of interest if the probability score assigned to said one or more spatial cells exceeds a predetermined detection threshold.

Thus it will be appreciated by those skilled in the art that the present invention provides a system that monitors the zone of interest (typically, but not necessarily, an area proximate to the location of said system) for unmanned aerial vehicles or "drones". The system is set up such that the area being monitored is split into a number of spatial cells, which are each analysed using the criteria outlined above to determine a composite likelihood that a drone is present within that cell. The indication of the presence of an unmanned aerial vehicle within one or more of the spatial zones may form any suitable warning such as a visual or audible alert or alarm that is provided to, by way of example only, a human operator or to additional computer-implemented security systems.

It will also be appreciated by those skilled in the art that evaluating the amplitude of a portion of a spectrum of the audio data includes evaluating the amplitude itself, but should also be understood to include evaluating the power of the portion of the spectrum or another quantity derived therefrom.

Thus when viewed from a second aspect, the present invention provides a system for detecting, classifying and tracking unmanned aerial vehicles in a zone of interest, the system comprising: at least one microphone array including a plurality of microphones, the at least one microphone array being arranged to provide audio data; at least one camera arranged to provide video data; and at least one processor arranged to process the audio data and the video data to generate a spatial detection probability map comprising a set of spatial cells, wherein the processor assigns a probability score to each cell within the set of spatial cells, said probability score being a function of: an audio analysis score generated by an audio analysis algorithm, said audio analysis algorithm comprising comparing the audio data corresponding to the spatial cell to a library of audio signatures; an audio intensity score generated by evaluating a power of at least a portion of a spectrum of the audio data corresponding to the spatial cell; and a video analysis score generated by using an image processing algorithm to analyse the video data corresponding to the spatial cell, wherein the system is arranged to indicate that an unmanned aerial vehicle has been detected in one or more spatial cells within the zone of interest if the probability score assigned to said one or more spatial cells exceeds a predetermined detection threshold.

Those skilled in the art will appreciate that a microphone array has similar functionality to an omnidirectional microphone, however they are also capable of pinpointing the direction of a sound source. Typical 2D microphone arrays may have a positioning range of 120° in both the x- and y-directions and a detection range of several hundred meters, providing a substantial area of coverage within the zone of interest. A typical 3D microphone array, which may include (but is not limited to) spherical microphone arrays, may have a truly omnidirectional positioning range (though such 3D microphone arrays still have a limited detection range). While some systems in accordance with the invention can detect drones using a single microphone array, in a set of embodiments the system comprises a plurality of microphone arrays disposed at different physical locations, each microphone array being arranged to capture audio data. This can provide multiple viewpoints of the zone of interest in order to enhance the capabilities of the system. However, in a subset of such embodiments, the audio data from at least two adjacent microphone arrays is combined so as to simulate a single, larger microphone array. The resulting larger microphone array may be better suited for the detection of certain, particularly lower, frequency ranges. Combining microphone arrays in this manner can also allow for collaborative processing that enhances the resolution and/or the range at which drones can be detected by combining the capabilities of the multiple microphone arrays. It will be appreciated that the microphone arrays may be of any suitable geometry and size and the invention is not limited to any specific configuration of microphone array.

Having multiple microphone arrays at different physical locations can also aid in determining how far away an unmanned aerial vehicle is and in at least some embodiments the system is arranged to determine depth within the zone of interest using audio data from a plurality of microphone arrays. In such embodiments, each microphone array provides a detection angle relative to its own position and combining these detection angles can provide the absolute distance to a detected unmanned aerial vehicle, e.g. using triangulation, time-of-flight, differential received power, the difference in spectral envelopes of multiple received signals, Doppler shift, etc. In some potentially overlapping embodiments, the system is arranged to determine depth within the zone of interest using video data. In such a case the size of an object detected within the camera's field-of-view or the difference in the size of an object within multiple camera's fields-of-view may be used to determine depth within the zone of interest.

While the system can detect drones using a single camera, in a set of embodiments the system comprises a plurality of cameras disposed at different physical locations. As is the case with the microphone array(s), having multiple cameras provides additional viewpoints of the zone of interest.

While the multiple cameras could be used to produce video data corresponding to completely separate, non-overlapping viewpoints within the zone of interest, in a set of embodiments video data from at least two of the plurality of cameras is co-registered to generate an image mapping therebetween. In such embodiments, there is at least some degree of overlap between the viewpoints covered by each camera and thus a co-registration algorithm, known in the art per se can be used in order to create the image mapping. Each microphone array may be associated with one or more cameras such that the "sound plane" of the microphone array is matched to the camera(s) associated therewith. Automated inter-camera calibration and co-registration may be carried out using image processing algorithms known in the art per se and can be used to co-register or "stitch" sound planes of different microphone arrays together. This is advantageous as it allows, for example, the system to be aware of an object detected in the video data from a first camera travelling toward the viewpoint of a second camera in advance.

While a single camera only provides a 2D projection of the 3D space, in a set of embodiments a plurality of cameras form a stereoscopic arrangement that detects depth within the zone of interest. In a subset of such embodiments, the plurality of cameras form a plurality of stereoscopic arrangements arranged to detect different depths within the zone of interest. This advantageous arrangement provides depth information from a number of different views, enhancing the certainty of the depth value determined by the processor.

Additionally or alternatively, in at least some embodiments audio data from at least one microphone array is used to enhance depth detection carried out using a plurality of cameras. This could be achieved by, for example, measuring the difference in time between the detection of a drone by a camera and by a microphone array. Since the speed of sound and the distance between the camera and the microphone array is known, the distance to the drone can be accurately determined from the difference in time between when the camera "sees" an event (such as the appearance of a drone or its motion in a certain direction) and when the microphone array "hears" that same event.

While the camera(s) utilised by the system may be standalone unit(s) separate from the microphone array(s), referred to hereinafter as "external cameras", in a set of embodiments at least one microphone array includes a camera. This "built-in" camera may be located on the surface of the microphone array, e.g. in the centre of the microphone array, surrounded by the individual microphones or any other fixed and known position relative to the microphone array. This then creates a relatively straightforward mapping between this camera and the associated microphone array. In some further embodiments, every microphone array includes a camera. This of course does not preclude the existence of any further external camera(s) which may be located elsewhere with further viewpoints of the zone of interest.

Given the microphone array(s) and camera(s) are typically strategically positioned by the user and are usually static, the spatial relationship between the two is usually known. Accordingly, in a set of embodiments at least two microphone arrays and/or cameras are mapped to one another using a known spatial relationship between the physical locations of the microphone array(s) and/or camera(s), such that said microphone array(s) and/or camera(s) share a common coordinate system. These may be Universal Transverse Mercator (UTM) coordinates as will be described in further detail below.

In some embodiments, the system comprises a peripheral sensor subsystem, wherein the peripheral sensor subsystem comprises at least one from the group comprising: a global navigation satellite system sensor; a gyroscope; a magnetometer; an accelerometer; a clock; an electronic anemometer; and a thermometer. In some such embodiments, the peripheral sensor subsystem is integrated into one or more microphone arrays. A system provided with such a peripheral sensor subsystem may utilise the components therein to enhance the detection capabilities of the system. For example, the system may be arranged to utilise data from the peripheral sensor subsystem to compensate for variations in sound propagation parameters such as wind velocity and temperature.

The number and density of spatial cells may be predetermined and fixed. In a set of embodiments the set of cells is generated automatically. Such generation may be based on factors such as resolution, the signal-to-noise ratio (SNR) of the output, the gain of the microphone array, processor capacity etc. In another set of embodiments, the generation of the set of spatial cells may be initiated by the user, e.g. by manually dividing the zone of interest into individual spatial cells. In a set of embodiments, the processor is arranged selectively to increase a number of spatial cells in at least a subset of said zone of interest if the probability score assigned to one or more spatial cells in said subset exceeds a predetermined cell density change threshold. In a subset of such embodiments, the cell density change threshold is lower than the detection threshold. This advantageously allows for a sparser, "cruder" preliminary scan to be carried out, and then if the system determines that a drone might be present but is unsure due to the insufficient number of cells, this can be increased as and when it is appropriate to do so. For example, each spatial cell may be subject to at least one beamforming operation wherein data from a plurality of microphones within one or more arrays is filtered according to a beamforming algorithm. In some arrangements, a sparser algorithm may initially choose to process only a subset of microphones, a subset of microphone arrays, or a subset of spatial cells which the zone of interest is divided into. Increasing the density only in the region where a drone is suspected to be may provide significant savings in the processing power required in order to analyse the spatial cells in which no drone has been detected.

In a set of embodiments, the processor is arranged selectively to refine the resolution of at least one microphone array and/or camera if the probability score assigned to said one or more spatial cells exceeds a predetermined resolution change threshold. In a subset of such embodiments, the resolution change threshold is lower than the detection threshold. This advantageously allows for a sparser, "cruder" preliminary scan to be carried out, and then if the system determines that a drone might be present but is unsure due to the insufficient resolution of either a microphone array, camera or both, an increased resolution can be applied. The refinement in resolution may be achieved by carrying out additional processing. For example, the data from the microphone array might initially be analysed for the presence of a drone such that individual analysed beams are first separated at angles of 10°, but upon the system determining that there is a significant probability that a drone may be present (i.e. if the probability score exceeds the resolution change threshold), the resolution may be increased such that the beams are instead separated by, for example 1°. A more computationally advanced or complex beamforming algorithm (e.g. a "super-directive beamformer" having a higher spatial resolution may then be applied in order to achieve more accurate positioning of a drone. Similarly, the video data from the camera may not be processed on a pixel-by-pixel basis, it may for example be downsampled such that the processor only has to analyse e.g. every other pixel or every other scan line etc. in order to reduce average processing power requirements. Then, if it is thought that a drone may have been detected, the processor may begin sampling every available pixel or at least every pixel in the vicinity of the estimated location of the drone.

Similarly, in a set of embodiments at least one camera is arranged to zoom in on an area within the zone of interest if the probability score assigned to said one or more spatial cells exceeds a predetermined zoom threshold. In a subset of such embodiments, the zoom change threshold is lower than the detection threshold. In this situation, the system can change the zoom of a camera to inspect an area within the zone of interest further if it is thought that a drone may be present therein. This zoom may be an optical zoom wherein the lens optics are moved in order to change the focal length of the camera or it may instead be a digital zoom wherein the zoom is performed artificially by enlarging the image. While a digital zoom may lead to a reduction in resolution, in certain circumstances it may still prove useful—however providing the camera(s) with optical zoom functionality is preferable.

In a set of embodiments, the set of spatial cells is further mapped to calibration data comprising a plurality of global positioning system coordinates. The Applicant has appreciated that this common coordinate system then allows for translation into the correct Universal Transverse Mercator (UTM) coordinates, a widely used map projection used to translate the longitude and latitude of a position on the spherical Earth to a position on a flat, 2D representation such as a map. There are of course other suitable map projections and those skilled in the art will appreciate that other appropriate transformations are equally viable.

In a set of embodiments, the calibration data is previously generated by a test global navigation satellite system (GNSS) device located on a calibration drone, said calibration drone being arranged to traverse the set of spatial cells. The calibration drone may produce a known audio signature that the system can detect. Additionally or alternatively, the calibration drone may have a known visual signature such as a particularly bright light source attached thereto that may be detected by the system. By arranging for the calibration drone to fly through the zone of interest such that it traverses some or all of the set of spatial cells and comparing a log of the GNSS coordinates recorded by the calibration zone to the spatial cells in which the calibration zone was detected by the system, it is then possible to create a one-to-one mapping of spatial cells to the appropriate GNSS coordinates. This requires synchronisation between the data from the GNSS device and the detection system. It will be appreciated that the terms "global navigation satellite system" and "GNSS" as used herein are not limited to any particular positioning system and should be understood to include all suitable positioning systems such as Global Positioning System (GPS), Global Navigation Satellite System (GLONASS), Galileo, and BeiDou. The Real Time Kinematic (RTK) satellite navigation technique, known in the art per se may also be used to enhance the precision of the positioning data obtained by the system.

While it is possible in post-processing to align the data from the microphone array(s) and the camera(s) temporally, in a set of embodiments each of the at least one microphone array(s) and/or camera(s) is time synchronised. In a subset of such embodiments, the time synchronisation is achieved by sending each microphone array and/or camera a timestamp generated by a central server. By synchronising the microphone array(s) and/or camera(s), it is possible to analyse the data from each source in real time, knowing with certainty that the data from each source corresponds to the data from each of the other synchronised source(s). The timestamp generated by the central server may be sent once during an initialisation of the system, or it may be sent continually throughout the operation of the system—either periodically or intermittently, e.g. as required. The timestamp may alternatively be provided by a non-centralised source such as GPS time information or from a cellular data network.

In a set of embodiments, audio data from at least one microphone array is used to guide the analysis of video data from at least one camera. Thus if the audio data indicates that a drone may be present in a particular region within the zone of interest, the processor may be instructed to perform more intensive analysis of the corresponding video data, such as performing more advanced image processing algorithms on a selection of the pixels to enhance the video analysis.

Additionally or alternatively, in a set of embodiments video data from at least one camera is used to guide the analysis of audio data from at least one microphone array. Similarly to the situation outlined above, if the video data indicates that a drone may be present in a particular region within the zone of interest, the processor may be instructed to perform finer beamforming or further refined audio signature matching on the corresponding audio data.

It will be appreciated by those skilled in the art that there are numerous image processing and machine vision techniques that can readily be applied to embodiments of the present invention. In a particular set of embodiments, the image processing algorithm comprises: calculating a mean frame from a subset of previously received video data frames; subtracting said mean frame from subsequently received video data frames to generate a difference image; and comparing said difference image to a threshold within each visual spatial cell to generate the video analysis score. It will of course be appreciated that the present invention is not limited to this particular algorithm and other algorithms can readily be used while remaining within the scope of the invention.

In a set of embodiments, the library of audio signatures comprises a plurality of audio signatures associated with unmanned aerial vehicles in a plurality of scenarios. These scenarios may, for example, include the sounds of the drones during flight, take off, landing, moving sideways, moving towards and away from a microphone array, indoors, outdoors etc.

It will be appreciated that there are a great number of different models of unmanned aerial vehicles or drones that are available on the market and the sounds produced by each model may vary drastically. Accordingly, in some embodiments the audio analysis algorithm comprises classifying the detected unmanned aerial vehicle. The classification of a detected unmanned aerial vehicle may, at least in some arrangements, be based on the closest match to an audio signature corresponding to a specific model. This may be particularly useful for identifying and tracking particular categories of drones. The classification of the detected unmanned aerial vehicle may additionally or alternatively be carried out visually and thus in a set of potentially overlapping embodiments, the image processing algorithm comprises classifying the detected unmanned aerial vehicle.

While it will be appreciated that a number of different analysis techniques, known in the art per se could be readily applied to the present invention, in at least some embodiments the audio analysis algorithm comprises a machine learning algorithm. This allows the system to analyse the audio data using pattern recognition and statistical models in order to generate the audio analysis score.

In a set of embodiments, the audio analysis algorithm further comprises compensating for a predetermined source of noise proximate to the zone of interest. These sources of noise might, by way of example only, include high winds, traffic noise, the sound of running water, etc. This allows for the system to ignore or cancel out these sources of noise in order to enhance the SNR of the system, improving its detection capability. In some such embodiments, the audio analysis algorithm comprises compensating for the predetermined source of noise automatically. In such embodiments, the system may be self-calibrating, requiring little or no user input to compensate for external, unwanted sources of noise.

In a set of embodiments, the audio analysis algorithm comprises a gradient algorithm, wherein the gradient algorithm is arranged to measure a relative change in a spatial audio distribution across one or more of the spatial cells. In such embodiments, the relative change of the spatial audio distribution (i.e. the audio data across the spatial cell or cells) may be indicative of presence of a drone.

In a set of embodiments, the processor is arranged to process said audio and visual data in a series of repeating timeframes such that it processes data for every spatial cell within each timeframe. It will be appreciated that this provides the system with at least a pseudo-parallel mode of operation in which the entire set of spatial cells is analysed every timeframe. However in a set of embodiments, the processor is arranged to analyse each spatial cell in parallel. In such embodiments where the processor is suitably powerful, all of the cells can truly be analysed in parallel.

It will be appreciated by those skilled in the art that the probability score may have any mathematical relationship with the audio analysis score, the audio intensity score, and the video analysis score as appropriate. In some embodiments, the probability score is a total of the audio analysis score, the audio intensity score, and the video analysis score. Alternatively, in at least some embodiments the probability score is an average of the audio analysis score, the audio intensity score, and the video analysis score. In some such embodiments the probability score is a weighted average of the audio analysis score, the audio intensity score, and the video analysis score. In some embodiments, the probability score function is varied dynamically during a regular operation of the system.

BRIEF DESCRIPTION OF THE DRAWINGS

Certain embodiments of the invention will now be described, by way of example only, with reference to the accompanying drawings in which:

FIG. 15 shows a constant noise source that can be compensated for in accordance with embodiments of the present invention;

FIG. 16 shows a subset of spatial cells of FIG. 8 having been further refined in the vicinity of the detected unmanned aerial vehicle; and FIG. 17 shows a block diagram of a further example of an audio analysis process using a feature detection and classification algorithm.

DETAILED DESCRIPTION

Figure 1:
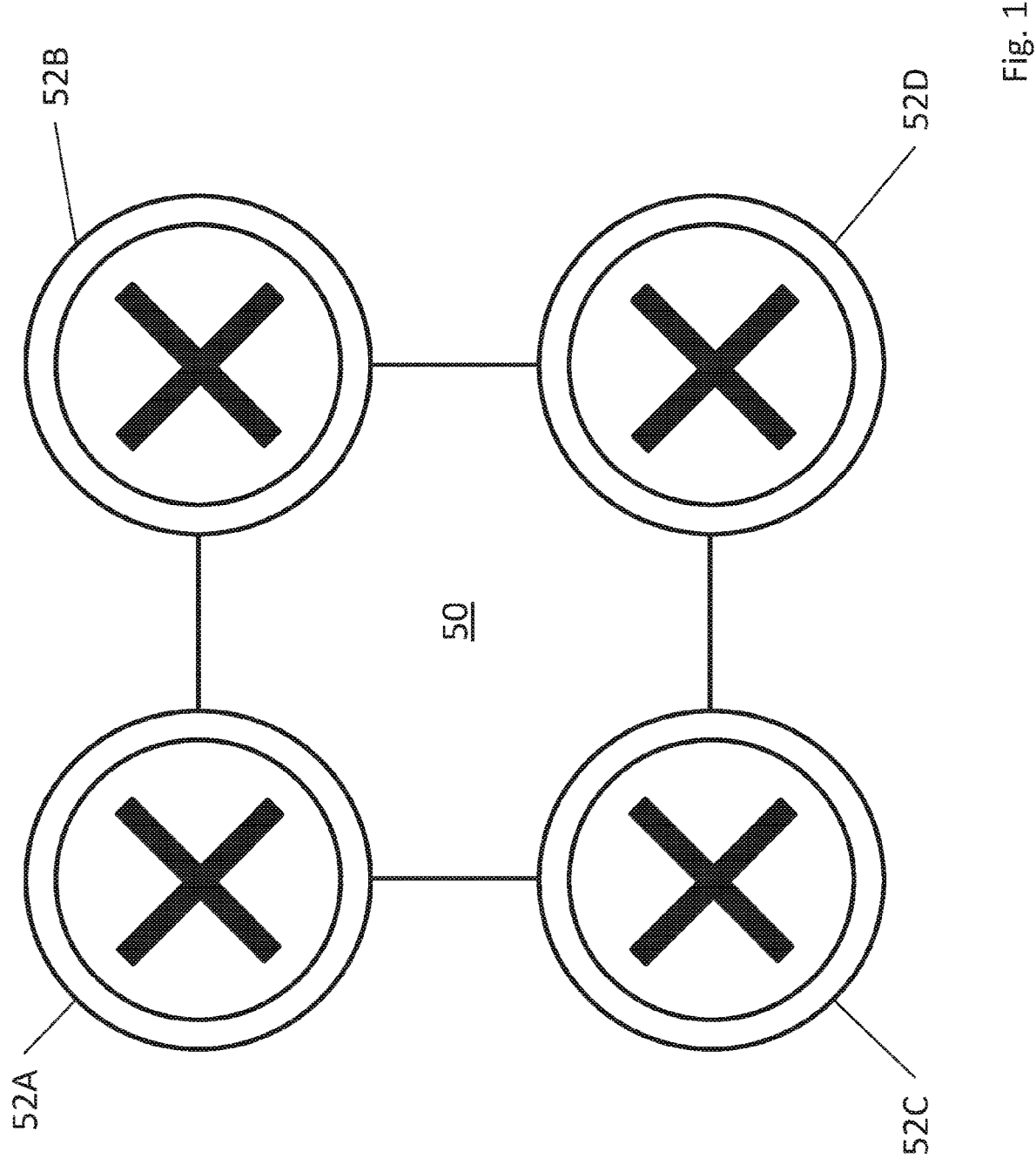
FIG. 1 shows a typical unmanned aerial vehicle to be detected by the described embodiments of the present invention.

FIG. 1 shows a typical unmanned aerial vehicle 50. This particular unmanned aerial vehicle (UAV) 50 has a conventional quadcopter form factor, wherein the body of the UAV 50 is surrounded by four rotors 52A, 52B, 52C, 52D.

These UAVs typically use a gyroscope for stability, using the data from the gyroscope to compensate for any unintended lateral motion. Such a quadcopter-based UAV uses the rotors 52A, 52B, 52C, 52D in two pairs. A first pair comprising rotors 52A, 52D rotate clockwise while the second pair comprising rotors 52B, 52C rotate counterclockwise. Each rotor 52A, 52B, 52C, 52D can be controlled independently in order to control the flight of the UAV 50. Varying the speeds of each of the rotors 52A, 52B, 52C, 52D allows for the generation of thrust and torque as required for a given flight path.

Such a UAV 50 possesses an audio signature (or set of audio signatures) that is characteristic thereof. For example, the sound of the rotors 52A, 52B, 52C, 52D during flight will contain peaks at specific frequencies within the frequency spectrum. These peaks may vary with particular flight manoeuvres such as: altitude adjustment (by increasing/decreasing the rotation speeds of the rotors 52A, 52B, 52C, 52D equally); "pitch" or "roll" adjustment (by increasing the rotation speed of one rotor and decreasing the rotation speed of its diametrically opposite rotor); or yaw adjustment (by increasing the rotation speed of rotors rotating in one direction and decreasing the rotation speed of the rotors rotating in the opposite direction). Different models and designs of such unmanned aerial vehicles will each have different audio signatures and can thus be identified as will be discussed further below.

Figure 2:
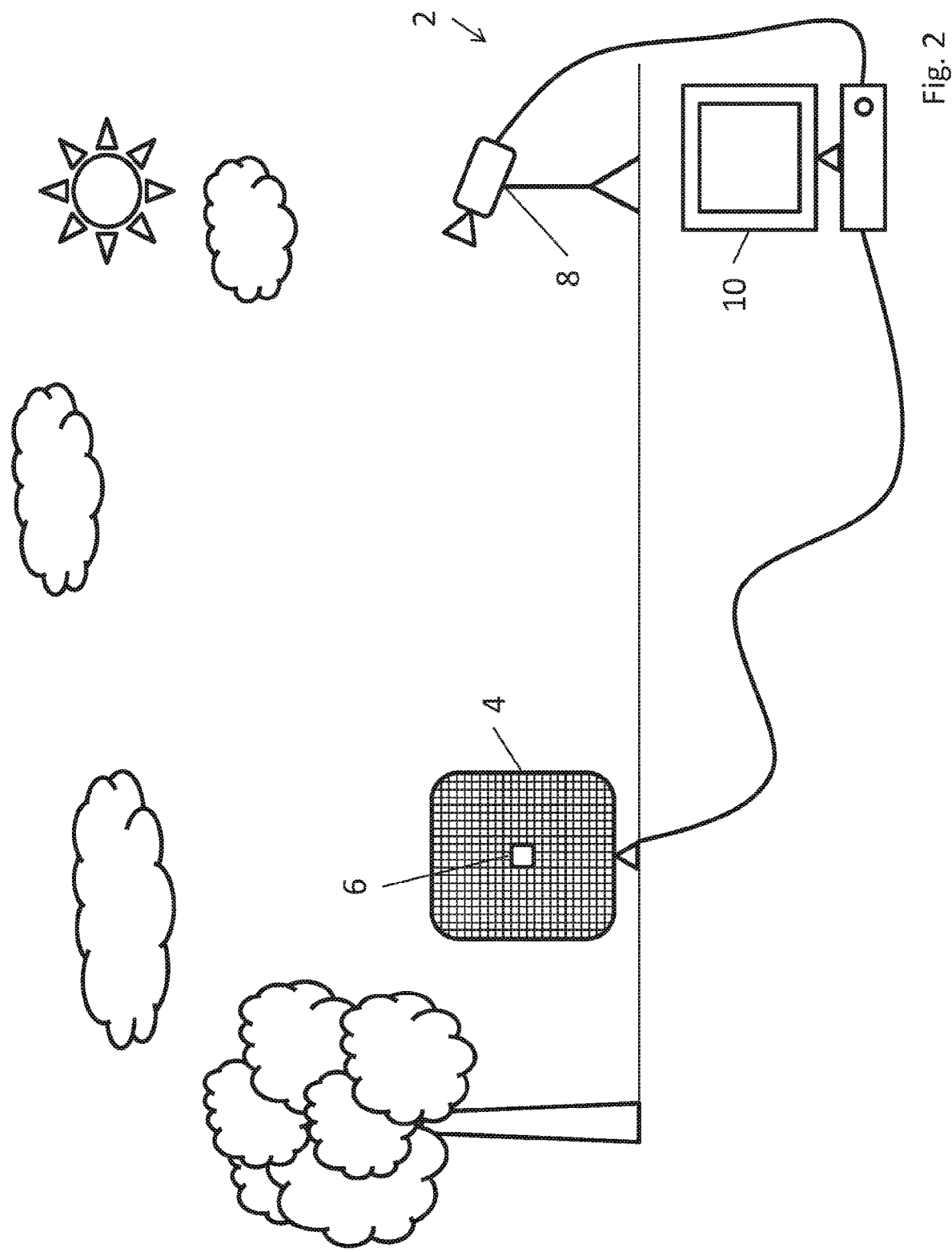
FIG. 2 shows an unmanned aerial vehicle detection system in accordance with an embodiment of the present invention.

FIG. 2 shows an unmanned aerial vehicle detection system 2 in accordance with an embodiment of the present invention. For the sake of clarity, this system 2 has only a single microphone array 4 and a single external camera 8. The microphone array 4 and external camera 8 are connected to a processor 10, which in this example is a computer terminal.

The microphone array 4 also has a built-in camera 6. This built-in camera 6 is positioned at the centre of the microphone array 4 and provides video data that corresponds to the same viewpoint as the audio data provided by the microphone array 4. However, it will be appreciated that the built-in camera 6 does not necessarily have to be positioned at the centre of the microphone array 4 and could instead be positioned at any other fixed point on the microphone array 4 or in close proximity to it.

The external camera 8 provides a separate viewpoint of the zone of interest (both due to physical location and different camera properties such as resolution, opening or viewing angles, focal lengths etc.), and does not have any directly related audio data associated with it. However, it should be noted that given the microphone array 4 has a built-in camera 6 (as described in further detail below), the external camera 8 is not strictly necessary, but enhances and augments the capabilities provided by the built-in camera 6.

The microphone array 4 is composed of a two-dimensional grid of microphones (though it will be appreciated that a three-dimensional array of microphones can also be used). Each microphone within the array 4 provides an individual audio channel, the audio produced on which differs slightly from every other microphone within the array 4. For example, because of their different positions, each microphone may receive a sound signal from a sound source (such as a UAV) at a slightly different time and with different phases due to the variation in distance that the sound signal has had to travel from the source to the microphone.

The audio data from the microphone array can then be analysed using beamforming.

Beamforming is used to create a series of audio channels or "beams" which the processor 10 analyses in order to determine the presence and origin of a received audio signal of interest. If audio data from a particular beam is of interest—i.e. a particular sound such as the sound of a drone is detected within the data corresponding to the beam, the angles that form that beam then provide an indication of the direction from which the sound originated, because the beam angles are known a priori for a given spatial cell. The processor is then able to determine that the sound originated from somewhere along the beam in 3D space, i.e. within the region of the zone of interest mapped to the spatial cell corresponding to the beam. It should be noted that beamforming itself provides only the direction from which the sound originated and not the distance, although the distance can be determined by embodiments of the present invention using other techniques as will be described further below.

Figure 3:
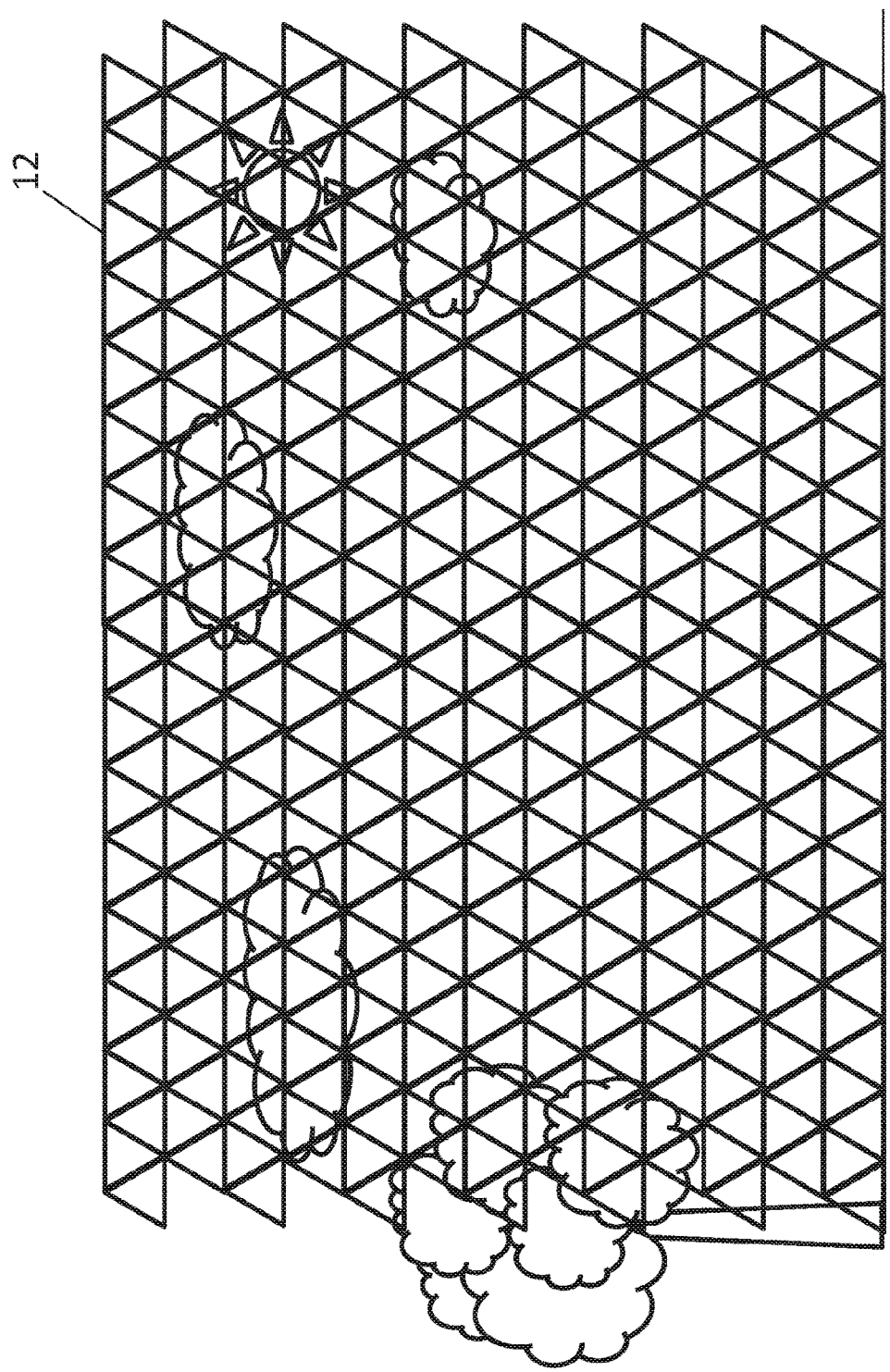
FIG. 3 shows a set of spatial cells used by the processor of the detection system of FIG. 2.

FIG. 3 shows a set of spatial cells 12 used by the processor 10 of the detection system 2 of FIG. 2. As can be seen from the Figure, the processor 10 divides the zone of interest into a set of spatial cells 12, which in this particular embodiment are triangular cells that tessellate to form a mesh.

Each individual cell within the set 12 corresponds to a beam formed by the microphone array 4, and thus the processor is able to determine whether a UAV is present in any given area to a resolution as fine as the size of the mesh permits. While the mesh that forms the set 12 in this particular embodiment is composed of triangular elements, it will be appreciated that the mesh could be formed from other shapes and such meshes are known in the art per se.

Each cell within the set 12 has an associated probability score corresponding to the likelihood of a drone being present in that cell as determined by the processor 10. This probability score is a function of three component scores as will be described below.

The first component score that the probability score is dependent on is an audio analysis score. The audio analysis score is generated by an audio analysis algorithm which compares the audio data corresponding to each spatial cell (and by extension, one microphone array beam) to a library of audio signatures. One possible algorithm is discussed in greater detail with reference to FIG. 7 below, however it will be appreciated that there are a number of such algorithms e.g. feature extraction and selection as outlined in FR2923043 (Orelia SAS), incorporated herein by reference and discussed with reference to FIG. 17 below, which can readily be applied in accordance with the present invention. Cells with sound signals that have a close match in the library of audio signatures will be given a higher audio analysis score than cells that do not produce a close match to any signature in the library.

An audio intensity score is used as a second component score by the processor 10 in determining the probability scores for each cell within the set 12. The audio intensity score is generated by comparing the amplitude of a portion of the spectrum of the audio data corresponding to each spatial cell to a predetermined threshold. Unmanned aerial vehicles have a tendency to produce sounds of relatively high volume, particularly at certain frequencies. This thresholding operation acts to filter out background sound sources that will likely be of lower amplitude in the relevant spectral region than the sound from a UAV that is to be detected. Cells with higher relevant spectral amplitude signals are given a higher audio intensity score than cells with lower relevant spectral amplitude signals. Cells with a higher audio intensity score can be given a high priority during audio analysis, meaning that the these high-scoring cells are analysed for signatures corresponding to a drone before lower-scoring cells.

Each cell within the set 12 is also given a video analysis score which is generated using an image processing algorithm. An image processing or machine vision algorithm is applied to the video data corresponding to each spatial cell and analysed for characteristic properties associated with UAVs. For example, the image processing algorithm might include: colour analysis; texture analysis; image segmentation or "clustering"; edge detection; corner detection; or any combination of these and/or other image processing techniques that are well documented in the art.

The image processing algorithm in this particular embodiment also includes motion detection. There are a number of motion detection algorithms, such as those that use motion templates, are well documented within the art per se. Exemplary algorithms particularly suitable for this invention include OpenCV and Optical Flow.

A probability score is then calculated for each of the cells based on the individual audio analysis, audio intensity, and video analysis scores, and the probability score is updated after each iteration of audio analysis and classification. There are many different ways in which this probability score might be calculated. For example, the probability score may be a total of the multiple component scores, or may be an average thereof. Alternatively the probability score could be a weighted average where the different component scores are given different weightings which may be set by the designer or varied dynamically by the processor 10.

The set of cells 12 forms a probability "heat map", wherein the probability of a UAV being present at any given point within the 2D projection of the 3D zone of interest is represented as a map.

Figure 4:
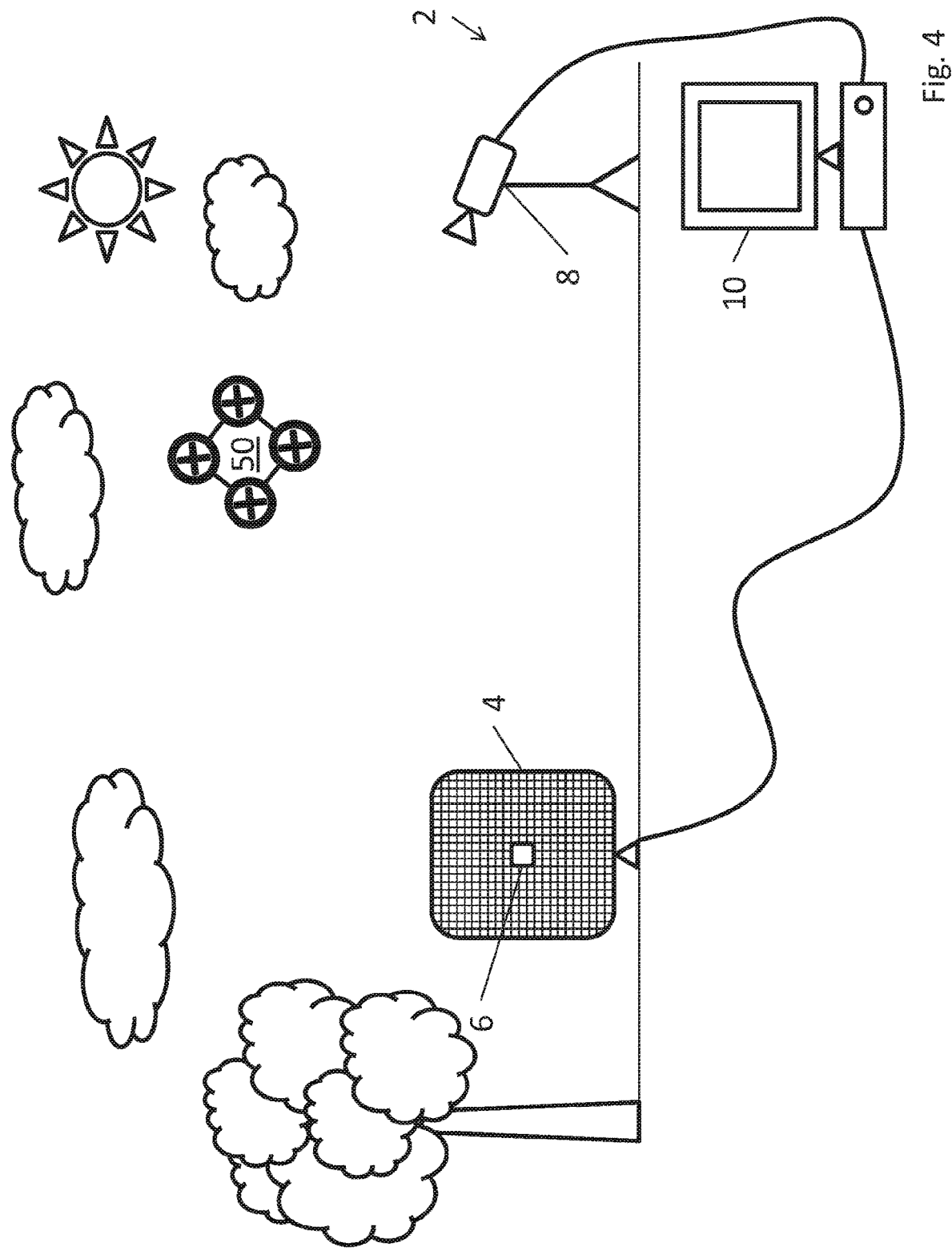
FIG. 4 shows the unmanned aerial vehicle of FIG. 1 entering the zone of interest of the detection system of FIG. 2.

FIG. 4 shows the unmanned aerial vehicle 50 of FIG. 1 having entered the zone of interest of the detection system 2 of FIG. 2. The UAV 50 is thus now visible to the microphone array 4, its associated built-in camera 6 and the external camera 8. As can be seen from FIG. 5, the UAV 50 occupies several of the cells 12.

Figure 6:
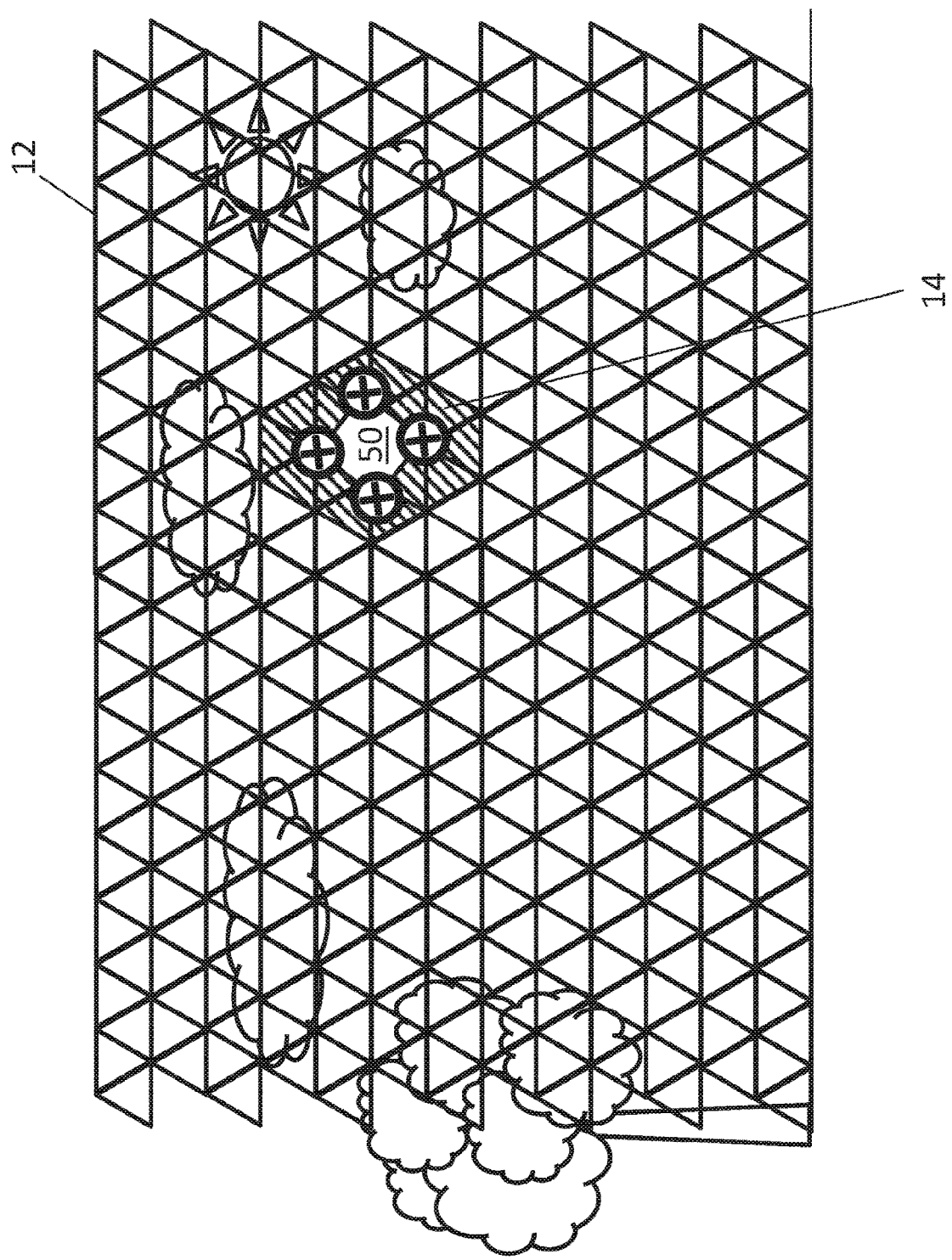
FIG. 6 shows the spatial detection probability map after analysis by the processor.

FIG. 6 shows the spatial detection probability map after analysis by the processor 10. A subset of cells 14 that the UAV 50 occupies is shaded to indicate that their respective probability scores are high in comparison with the remainder of the cells 12. This shading indicates that the processor 10, having carried out the audio and video analysis described above, has calculated the probability scores in this subset 14 is greater than the surrounding cells 12.

In this particular example, the probability scores in each cell within the subset 14 is greater than the detection threshold which is applied by the processor 10. Thus the detection system 2 determines that the UAV 50 is located in the airspace that corresponds to the real locations to which the subset of cells 14 are mapped. The detection system 2 may then raise an alarm to alert a user that the UAV 50 has been detected. The detection system 2 might also begin tracking the movements of the UAV 50.

Figure 7:
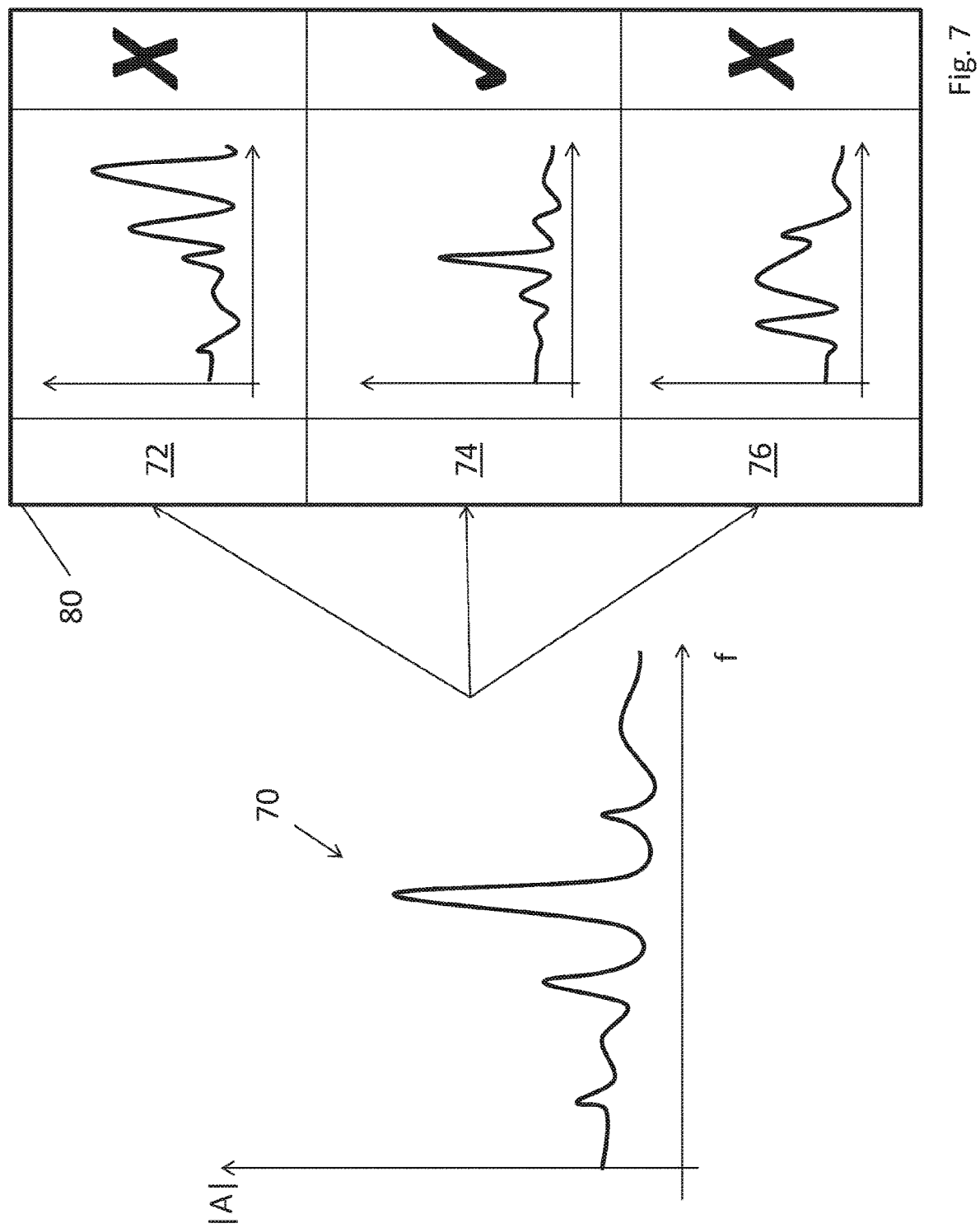
FIG. 7 shows one example of an audio analysis process using an audio signature library.

FIG. 7 shows one example of an audio analysis process using an audio signature library 80. The processor 10 analyses the data from the microphone array 4 to determine whether the sounds that are being received correspond to a UAV and if so, which model of UAV it is likely to be.

The audio data from the microphone array 4 is Fourier transformed in order to produce a frequency spectrum 70 corresponding to the received audio data for a given cell within the set of cells 12 (i.e. the audio corresponding to a particular beam). This frequency spectrum 70 shows the magnitude |A| for each frequency f within a given range. In this particular example, the range is from 100 Hz to 10 kHz. While the frequency spectrum 70 shown here appears to be continuous, the spectra will typically be discrete in real applications due to the finite quantisation levels utilised by the processor 10. It will be understood that other domain transforms related to the Fourier transform known in the art per se such as a discrete cosine transform (DCT) or modified discrete cosine transform (MDCT) could also be readily applied to produce a suitable frequency spectrum.

This frequency spectrum 70 is then compared to a library of audio signatures 80 in order to look for a match. For the sake of clarity, only three stored audio signatures 72, 74, 76 are shown on the Figure; a practical system however will of course have a far more extensive library. The processor 10 determines that the spectrum 70 is not a close match for the spectra associated with two of the audio signatures 72, 76 but does indeed match the spectra of the middle audio signature 74, shown in the Figure by the checkmark. Thus the processor determines through the audio analysis that the spectrum 70 from the associated cell corresponds not only to the presence of the UAV 50 but also indicates what type of UAV it is.

Figure 5:
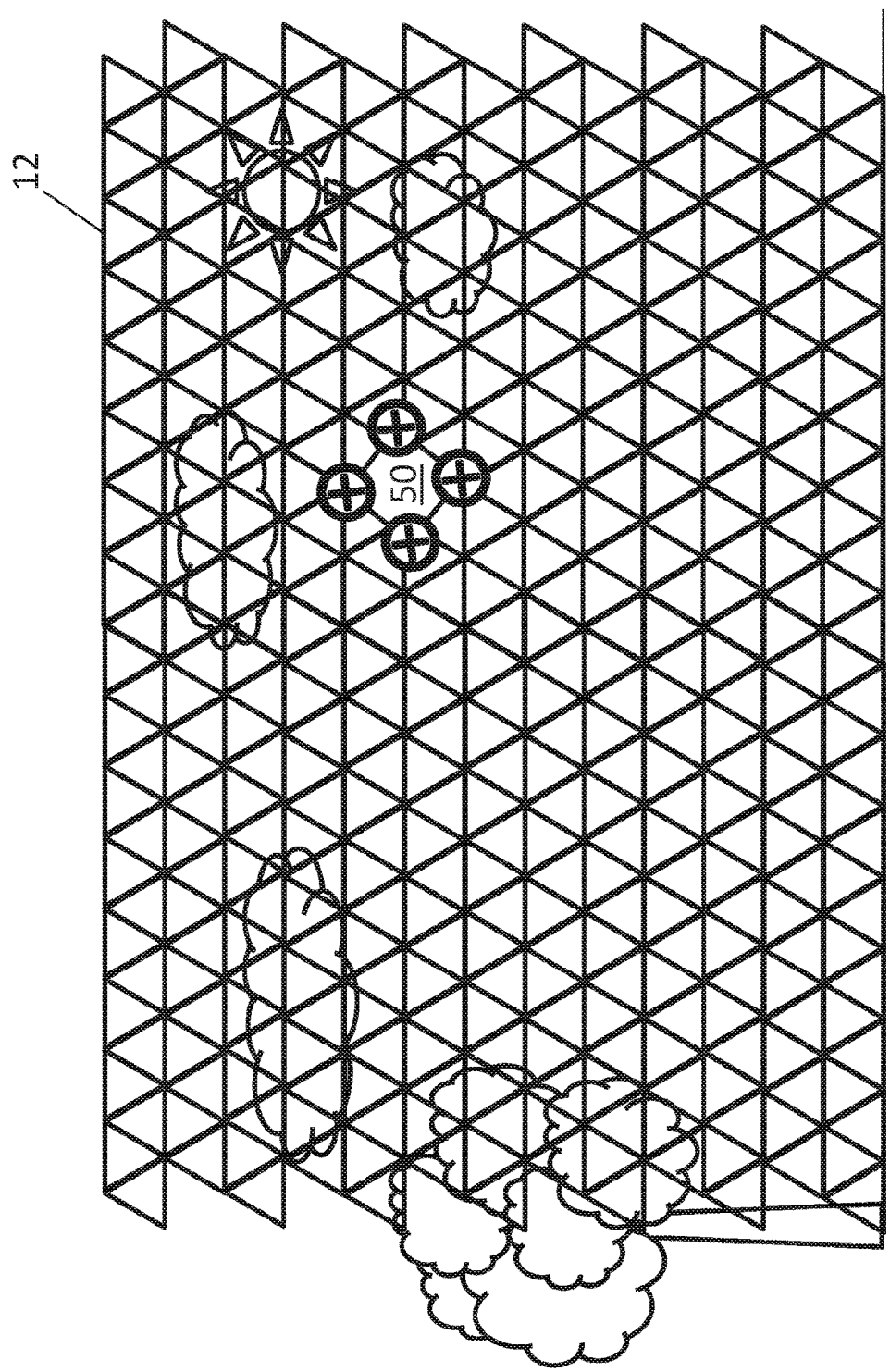
FIG. 5 shows a set of spatial cells used by the processor of the detection system of FIG. 2 as the unmanned aerial vehicle enters.
Figure 8:
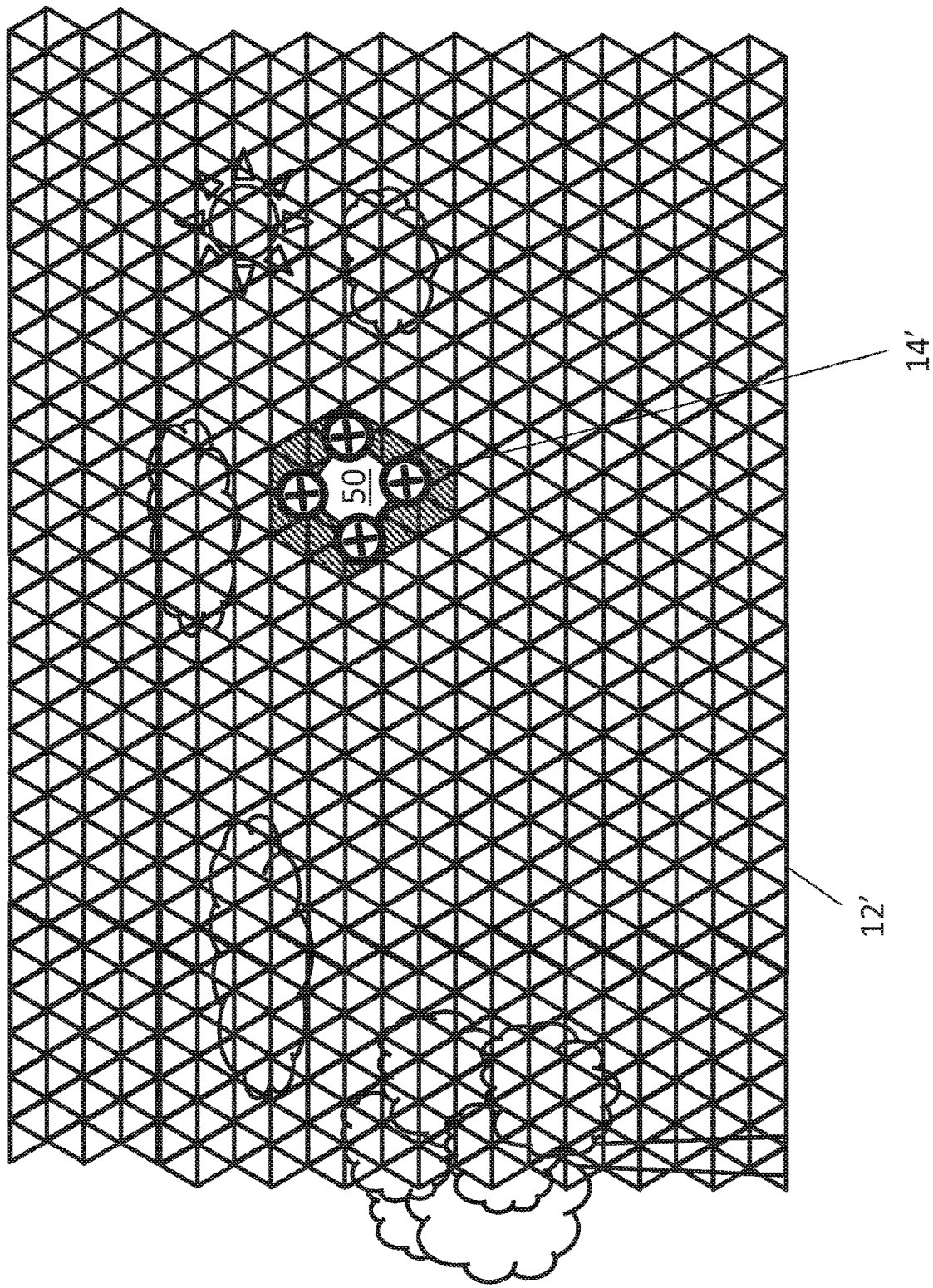
FIG. 8 shows the set of spatial cells of FIG. 5 having been refined after the unmanned aerial vehicle has been detected.

FIG. 8 shows the set of spatial cells 12' of FIG. 5 having been refined after the unmanned aerial vehicle 50 has been detected. While it was described above with reference to FIG. 5 that the cells 14 had an associated probability score that exceeded the detection threshold, it may be the case that while the score was higher than usual, it was not sufficient to state with reasonable certainty that the UAV 50 was present in the zone of interest.

Alternatively, the processor 10 may be reasonably certain that the UAV 50 is in the zone of interest and now wishes to obtain a better estimate of its position and dimensions.

In either case, it may be that the probability score associated with these cells 14 exceeds a resolution change threshold. Once this occurs, the processor can decide to increase the resolution of the mesh, thus producing a refined set of cells 12'. As can be seen by comparing the set of cells 12' in FIG. 8 to the set of cells 12 in FIG. 5, the triangular cells have been made smaller and more numerous, i.e. the cell density has been increased. For example, the beams formed using the microphone array 4 may have been separated by 10° angular spacings, but are now spaced only by 1°. This may be done across the whole zone of interest or, preferably, only in the vicinity of the increased probability score.

Now that the individual cells are smaller, which of course increases the processing power requirements, the subset of cells 14' which correspond to the position of the UAV 50 provide a "tighter fit" to the shape of the UAV 50. The increase in shading density also indicates that the probability score associated with each of the cells within the subset 14' is higher than was previously the case in FIG. 5, i.e. the processor 10 is now more certain that the UAV 50 is indeed present in that area.

Figure 9:
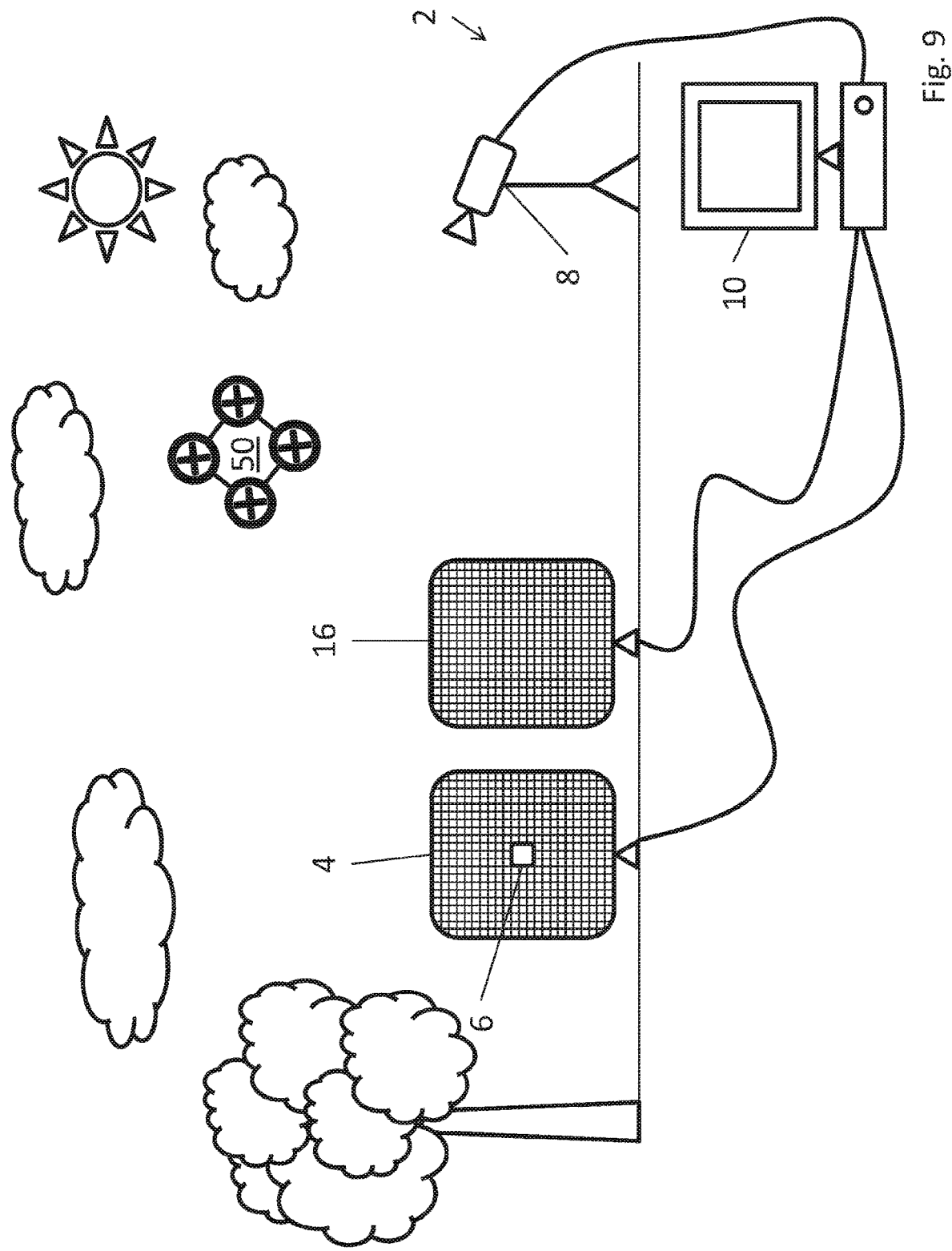
FIG. 9 shows an unmanned aerial vehicle detection system in accordance with a further embodiment of the present invention that utilises multiple microphone arrays.

FIG. 9 shows an unmanned aerial vehicle detection system 2 in accordance with a further embodiment of the present invention that utilises multiple microphone arrays 4, 16. In this embodiment, the system 2 as previously described is provided with an additional microphone array 16. This particular microphone array 16 does not possess a built-in camera like the original array 4, but it will be appreciated by those skilled in the art that any combination of arrays with or without built-in cameras can be added to the system 2 as required by a given application.

In this case, the two microphone arrays 4, 16 can each be used in a beamforming process and each provides audio data to the processor 10. The microphone arrays 4, 16 can provide different "viewpoints" of the zone of interest. This allows different "subzones" within the zone of interest to be monitored by each array 4, 16, since each array can only provide a view of a finite area.

Alternatively, if the two arrays 4, 16 are positioned sufficiently close together, they can be combined to provide the functionality of a single, bigger "superarray". This superarray then has a greater resolution than a single array.

Figure 10:
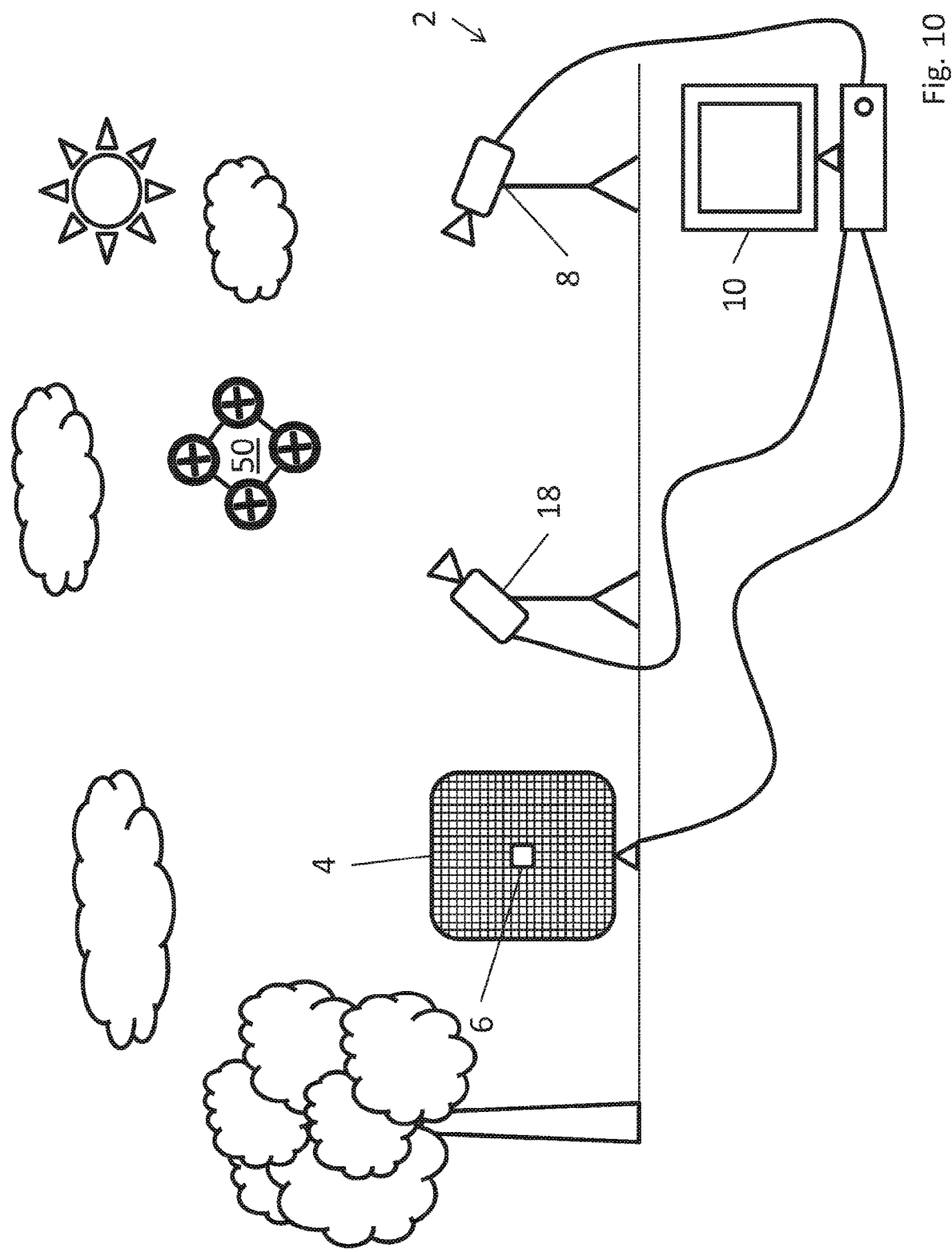
FIG. 10 shows an unmanned aerial vehicle detection system in accordance with a further embodiment of the present invention that utilises multiple cameras.

FIG. 10 shows an unmanned aerial vehicle detection system 2 in accordance with a further embodiment of the present invention that utilises multiple external cameras 8, 18. Similarly to the embodiment described with reference to FIG. 9, those skilled in the art will appreciate that any combination of external cameras, microphone arrays with built-in cameras, and microphone arrays without built-in cameras is contemplated.

The two external cameras 8, 18 are positioned at different locations and each provides a different view of the zone of interest as will be described with reference to FIG. 11 below. The two cameras 8, 18 may have different properties, such as different focal lengths, zoom capabilities, ability to pan and/or tilt etc. or they could be identical, depending on the requirements of the application.

Each camera can be represented by its intrinsic parameters as shown below with reference to Eqn. 1:

$$A_n = \begin{bmatrix} \alpha_{x,n} & \gamma_n & u_{0,n} \\ 0 & \alpha_{y,n} & v_{0,n} \\ 0 & 0 & 1 \end{bmatrix}$$

Eqn. 1: Intrinsic camera parameters wherein: $A_n$ is the intrinsic camera parameter matrix of the $n^{th}$ camera; $\alpha_{x,n}$ is the focal length multipled by a scaling factor in the x-direction for the $n^{th}$ camera; $\alpha_{y,n}$ is the focal length multipled by a scaling factor in the y-direction for the $n^{th}$ camera; $\gamma_n$ is a skew parameter of the $n^{th}$ camera; and $u_{0,n}$, $v_{0,n}$ is the "principle point" of the image produced by the $n^{th}$ camera which is typically but not always the centre of the image in pixel coordinates. It will be appreciated that this is one model of the intrinsic parameters of the camera, and other parameters may be included within the intrinsic parameter matrix such as optical distortion—providing for e.g. barrel distortion, pincushion distortion, mustache distortion, etc.

Figure 11:
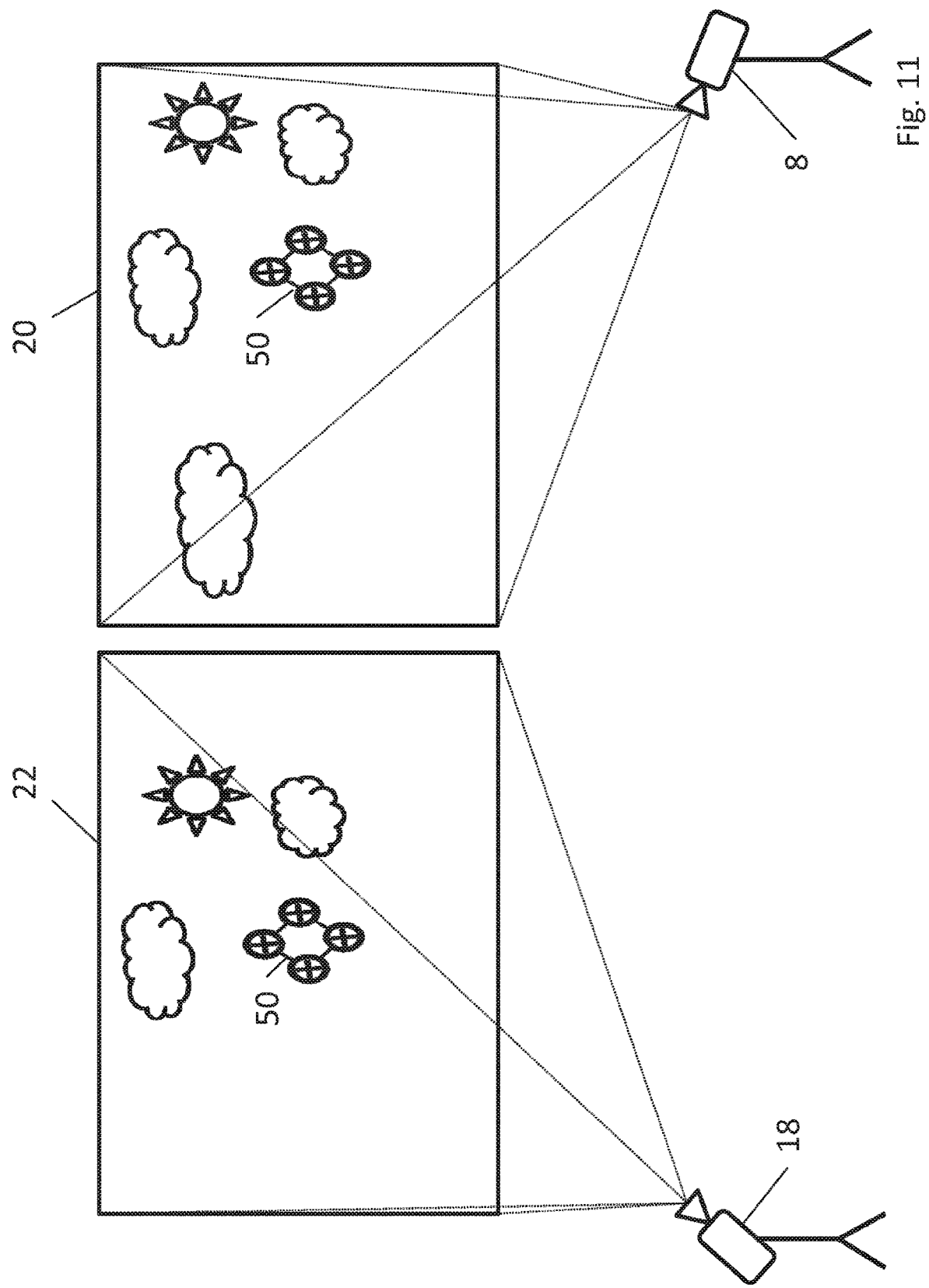
FIG. 11 shows the viewpoints of the cameras of FIG. 10.

FIG. 11 shows the viewpoints 20, 22 of the cameras 8, 18 respectively as described above with reference to FIG. 10. The first camera 8 provides a first viewpoint 20 of the zone of interest, which has a certain "rotation" and "skew" associated with it due to the position and angle at which the camera 8 is installed. Similarly, the second camera 18 provides a second viewpoint 22 of the zone of interest which has a different rotation and skew to the first viewpoint 20. Each camera 8, 18 therefore has a slightly different view of the zone of interest (e.g. the second camera 18 cannot "see" the leftmost cloud but the first camera 8 can).

Figure 12:
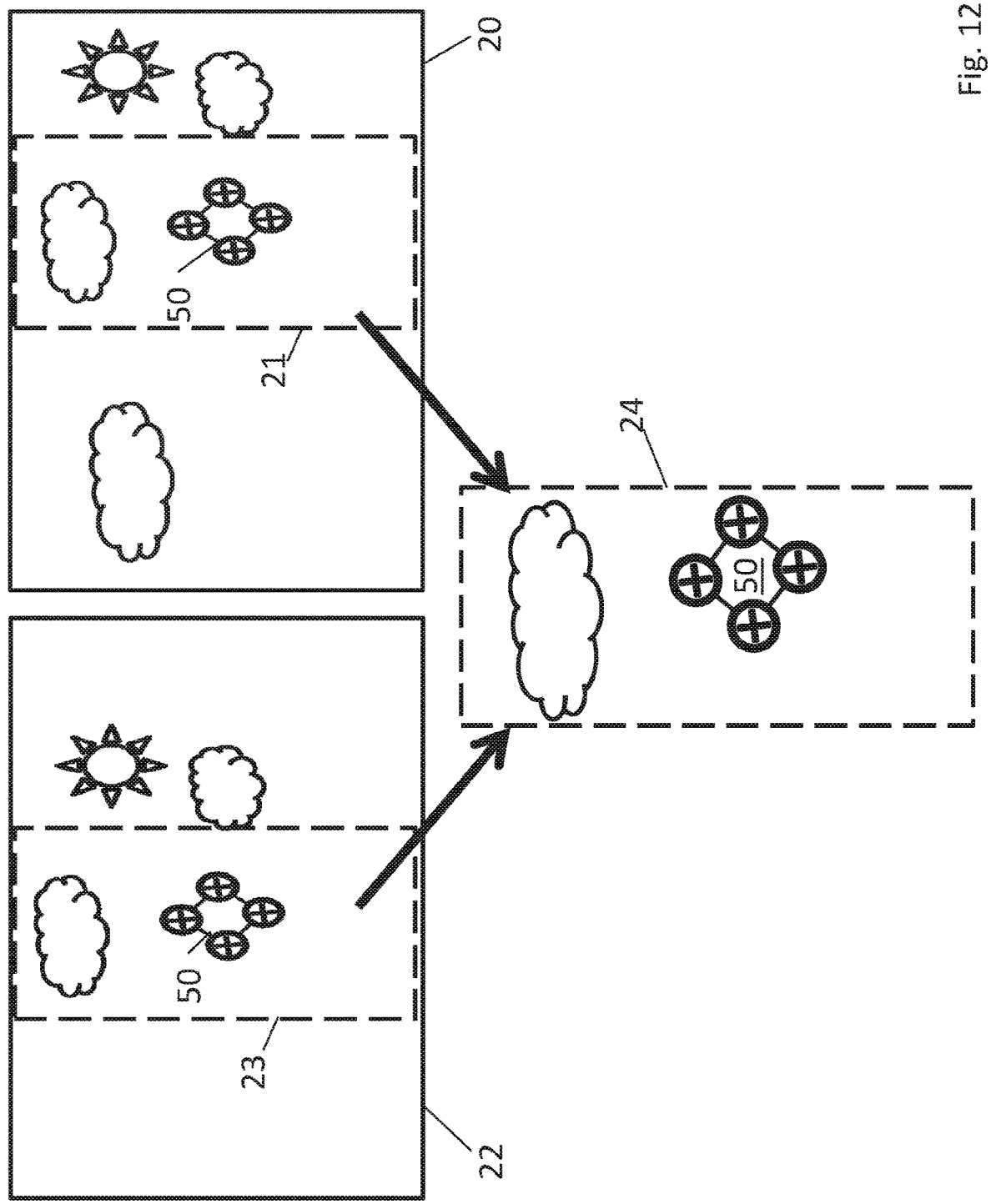
FIG. 12 shows co-registration of the viewpoints of FIG. 11.

FIG. 12 shows co-registration of the viewpoints 20, 22 as described previously with reference to FIG. 11. As can be seen from FIG. 12, there is an area 21 within the first viewpoint 20 that has a strong correspondence with an area 23 within the second viewpoint 22. Since the positions and properties of the cameras 8, 18 are known, these viewpoints 20, 22 can be directly compared by mapping one to the other. In fact, even if the relative camera positions were not known a priori, there are numerous image processing techniques known in the art per se that could determine the camera-to-camera mapping.

With this knowledge, the two viewpoints 20, 22 can be co-registered and can also be translated to a "real world" image having depth. The two areas 21, 23 for example can be mapped back to a real world area 24 that "looks at" the zone of interest face on.

This is achieved by having a matrix C that represents the position or "pose" of the camera as given in Eqn. 2 below:

$$C_n = [-R_n^T T_n]$$

Eqn. 2: Extrinsic camera parameters wherein: $C_n$ is the camera pose matrix of the $n^{th}$ camera; $R_n$ is a rotation matrix for the $n^{th}$ camera that translates the rotation of the camera to the common coordinates; and $T_n$ is a translation matrix for the $n^{th}$ camera that translates the position of the camera to the common coordinates, where the general form of the rotation matrix $R_n$ and translation matrix $T_n$ are known in the art per se.

Mapping a camera's local coordinates to the common coordinate system can be achieved using Euler angles or Tait-Bryan angles to rotate the local coordinates to the common coordinate system, wherein the rotations are around the x-, y- and z-axes. In an example, a right-handed coordinate system is used, e.g. x-axis is positive on the right side, y-axis is positive in the downwards direction, and z-axis is positive along the line of sight. This involves carrying out four distinct rotations, each of which can be represented as a separate rotation matrix, and these four rotation matrices can be combined into a single rotation matrix that provides:

A fixed rotation of 270° around camera's x-axis;

Pan: rotation around camera's y-axis;

Tilt: rotation around camera's x-axis; and

Roll: rotation around camera's z-axis.

The camera coordinate system can therefore be aligned with the common real world coordinate system. In the case of UTM this implies that the camera x-axis is aligned with east, the camera y-axis is aligned with north and the camera z-axis is aligned with height.

The positions and angles corresponding to the microphone array(s) can be mapped to the common coordinates in a similar way and thus all of the audio and video data sources can use a common coordinate system, which is also used by the processor 10 as the basis for the probability map comprising the set of cells 12, 12'.

Since there are multiple cameras 8, 18 with an overlapping area 24, and the relationship between said cameras 8, 18 is known, it is possible to determine the depth of an object such as the UAV 50 within said area 24 by comparing the pixels in each image corresponding to the UAV 50 in the two viewpoints 20, 22 using stereoscopy techniques that are known in the art per se. A similar pairing may be made between the built-in camera 6 and either or both of the external cameras 8, 18 to provide further depth information. This depth information may also be augmented by the audio data from the microphone array 4.

Figure 13:
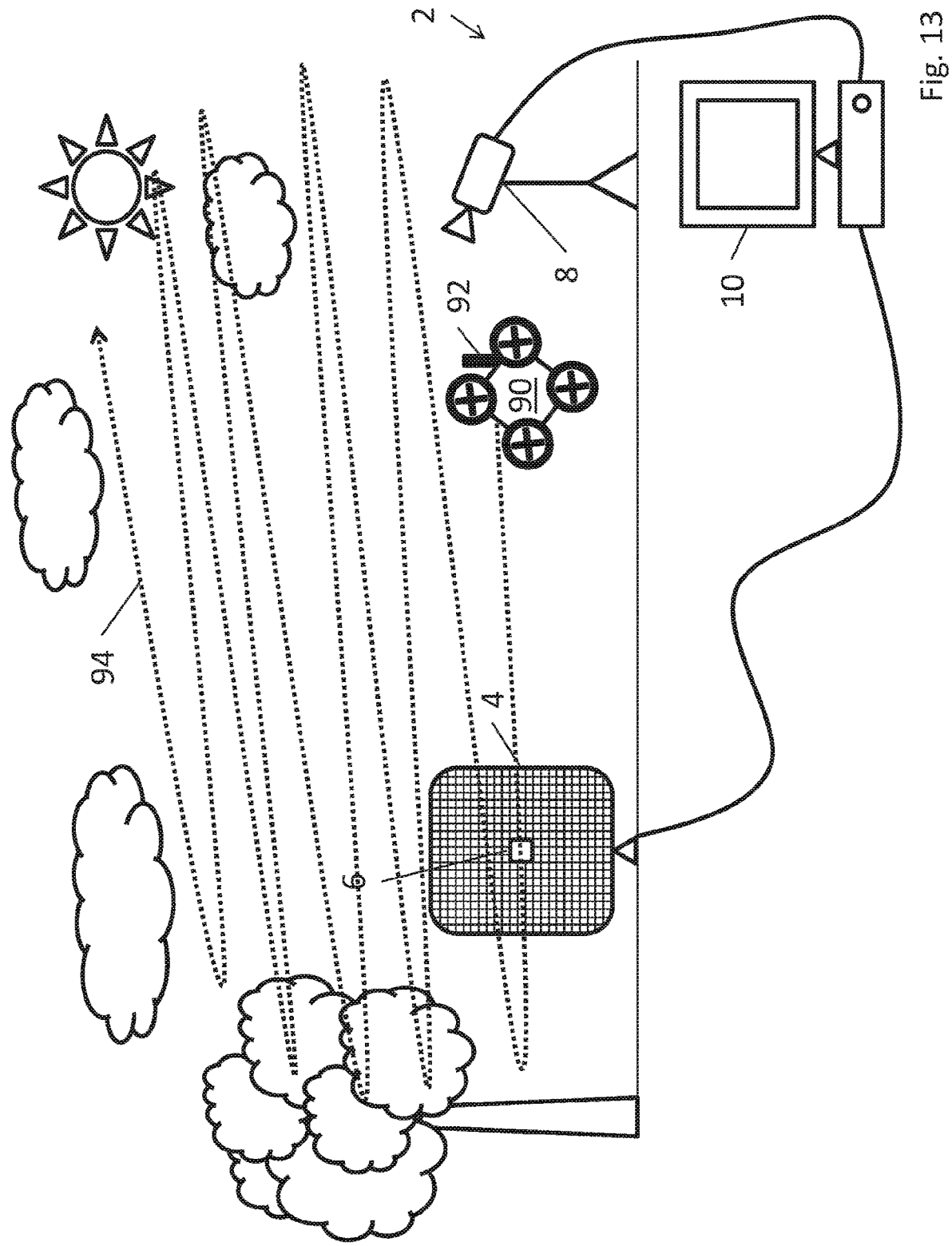
FIG. 13 shows the operation of a calibration drone used to map the spatial cells to real world GPS coordinates.

FIG. 13 shows the operation of a calibration drone 90 used to map the spatial cells to real world GPS coordinates. The calibration drone 90 is flown throughout the zone of interest that is to be monitored by the detection system 2. The calibration drone is flown by a user (either manually or using a predetermined, automatic flight path) along the path 94.

The calibration drone is also fitted with a global positioning system (GPS) sensor 92. The GPS sensor 92 is used to log the real world coordinates of the calibration drone as it travels along the path 94. The processor 10 has a shared common timestamp with the GPS sensor 92, and thus the GPS data logged by the calibration drone 90 can be compared directly to the audio and video data provided by the microphone array 4, built-in camera 6 and external camera 8. This enables a correspondence between the spatial cells and GPS coordinates to be established as will be described below.

Figure 14:
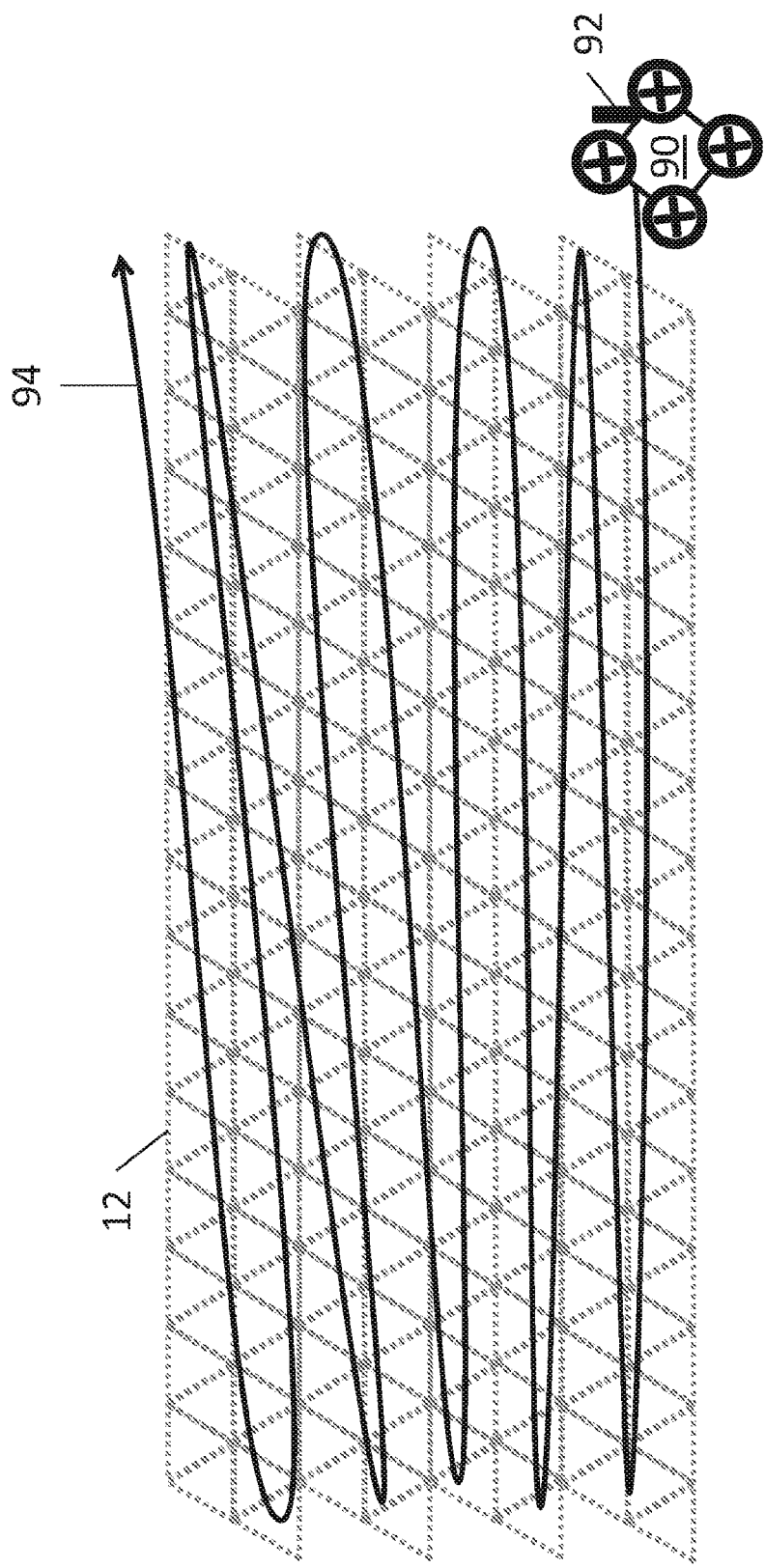
FIG. 14 shows how the spatial cells used by the processor of FIG. 13 are calibrated using the calibration drone.

FIG. 14 shows how the spatial cells 12 used by the processor of FIG. 13 are calibrated using the calibration drone 90. Since the GPS sensor 92 and the processor 10 are time synchronised, the processor can compare the times at which the calibration drone 90 traversed each cell with the GPS data from the GPS sensor 92 and obtain a one-to-one calibration mapping from the spatial cells 12 to real world GPS coordinates. Then, during regular operation, a detected UAV such as the UAV 50 can be pinpointed on a real world map since the cells it is detected within have a known position. This can be achieved by translating the coordinates into the correct Universal Transverse Mercator (UTM) coordinates. The coordinates could, of course, be translated into other coordinate systems as required by the end-user.

FIG. 15 shows a constant noise source that can be compensated for by the detection system 2. In this Figure, the detection system 2 has been installed proximate to a wind turbine 100. The wind turbine 100, when in use, produces a relatively constant noise, which may cause difficulty in detecting unmanned aerial vehicle via sound. However, the processor 10 is arranged such that it can be calibrated to ignore such sources of constant noise. This can be achieved by calibrating the system when no drones are in the area, such that any sounds heard during calibration that are later heard during runtime can be subtracted from the runtime sound. This filtering procedure could involve spatial cancellation using beamforming algorithms, time-frequency domain filtering procedures, or a combination of the two. Additionally or alternatively, the processor 10 may be calibrated to ignore certain frequencies of sound that are known to be noise sources e.g. the wind turbine 100 producing a constant 50 Hz noise, or to spatially band-stop the known and stationary position of the unwanted noise.

FIG. 16 shows a subset of spatial cells 14" of FIG. 8 having been further refined in the vicinity of the detected unmanned aerial vehicle. In this particular example, the processor has decided to further increase the resolution of the mesh only in the vicinity of the UAV 50, thus producing a refined set of cells 14". As can be seen by comparing the set of cells 14' in FIG. 8 to the set of cells 14" in FIG. 16, the triangular cells have been made even smaller, i.e. the cell density has been further increased. This new subset of cells 14" provides an even tighter fit to the shape of the UAV 50. It will be appreciated that there may not be an intermediate step of increasing the resolution globally before increasing it only in the vicinity of the drone, and the resolution may only be increased locally depending on processing requirements.

FIG. 17 shows a block diagram of a further example of an audio analysis process using a feature detection and classification algorithm 200. In this algorithm 200, the audio data 202 corresponding to a particular beam is passed through a feature extraction block 204, a feature selection block 206, and a classifier block 208 in order to determine the classification 212 of the audio data 202.

The feature extraction block 204 implements temporal analysis, using the waveform of the audio signal 202 and/or spectral analysis using a spectral representation of the audio signal 202 for analysis. The feature extraction block 204 analyses small segments of the audio signal 202 at a time and looks for certain features such as pitch, timbre, roll-off, number of zero crossings, centroid, flux, beat strength, rhythmic regularity, harmonic ratio etc.

The set of features 205 extracted by the feature extraction block 204 are then input to the feature selection block 206. The feature selection block 206 then selects a specific subset of features 207 that are chosen to be those most indicative of the noise source (e.g. a drone) to be looked for. The subset of features 207 is chosen to provide an acceptable level of performance and high degree of accuracy for classification (e.g. does not provide too many false positives and false negatives) and reduces computational complexity by ensuring the chosen features are not redundant—i.e. each chosen feature within the subset 207 provides additional information useful for classification that is not already provided by another feature within the subset 207.

The chosen subset of features 207 is then passed to the classifier block 208. The classifier block 208 then uses a classifier algorithm such as a k-nearest neighbour classifier or a Gaussian mixture classifier. The classifier block 208 may also take statistical models 210 as an input. These statistical models 210 may have been built up based on training data wherein the classification labels (e.g. a specific model of drone) are assigned manually to corresponding audio data and can aid the classifier block 208 in making its determination of what is present within the audio signal 202. The classifier block 208 then outputs a classification label 212 such as "drone present", "drone not present" or it might name a specific model of drone.

Thus it will be seen that distributed, collaborative system of microphone arrays and cameras that uses various statistical analysis, spatial filtering and time-frequency filtering algorithms to detect, classify and track unmanned aerial vehicles over a potentially large area in a number of different environments has been described herein. Although particular embodiments have been described in detail, it will be appreciated by those skilled in the art that many variations and modifications are possible using the principles of the invention set out herein.

The invention claimed is:

1. A system for detecting, classifying and tracking unmanned aerial vehicles in a zone of interest, the system comprising:
   at least one microphone array including a plurality of microphones, the at least one microphone array being arranged to provide audio data;
   at least one camera arranged to provide video data; and
   at least one processor arranged to process the audio data and the video data to generate a spatial detection probability map comprising a set of spatial cells, wherein the processor assigns a probability score to each cell within the set of spatial cells, said probability score being a function of:
   an audio analysis score generated by an audio analysis algorithm, said audio analysis algorithm comprising comparing the audio data corresponding to the spatial cell to a library of audio signatures;

an audio intensity score generated by evaluating an amplitude of at least a portion of a spectrum of the audio data corresponding to the spatial cell; and a video analysis score generated by using an image processing algorithm to analyse the video data corresponding to the spatial cell, wherein the system is arranged to indicate that an unmanned aerial vehicle has been detected in one or more spatial cells within the zone of interest if the probability score assigned to said one or more spatial cells exceeds a predetermined detection threshold.

2. The system as claimed in claim 1, comprising a plurality of cameras and wherein audio data from the at least one microphone array is used to enhance depth detection carried out using the plurality of cameras.

3. The system as claimed in claim 1, comprising a plurality of microphone arrays wherein every microphone array includes a camera.

4. The system as claimed in claim 1, wherein at least two microphone arrays and/or cameras are mapped to one another using a known spatial relationship between the physical locations of the microphone array(s) and/or camera(s), such that said microphone array(s) and/or camera(s) share a common coordinate system.

5. The system as claimed in claim 1, wherein the system comprises a peripheral sensor subsystem, wherein the peripheral sensor subsystem comprises at least one from the group comprising: a global navigation satellite system sensor; a gyroscope; a magnetometer; an accelerometer; a clock; an electronic anemometer; and a thermometer.

6. The system as claimed in claim 5, wherein the peripheral sensor subsystem is integrated into one or more microphone arrays.

7. The system as claimed in claim 1, wherein the set of cells is generated automatically.

8. The system as claimed in claim 1, wherein the processor is arranged selectively to increase a number of spatial cells in at least a subset of said zone of interest if the probability score assigned to one or more spatial cells in said subset exceeds a predetermined cell density change threshold.

9. The system as claimed in claim 8, wherein the cell density change threshold is lower than the detection threshold.

10. The system as claimed in claim 1, wherein the processor is arranged selectively to refine the resolution of at least one microphone array and/or camera if the probability score assigned to said one or more spatial cells exceeds a predetermined resolution change threshold.

11. The system as claimed in claim 10, wherein the resolution change threshold is lower than the detection threshold.

12. The system as claimed in claim 1, wherein at least one camera is arranged to zoom in on an area within the zone of interest if the probability score assigned to said one or more spatial cells exceeds a predetermined zoom threshold.

13. The system as claimed in claim 12, wherein the zoom change threshold is lower than the detection threshold.

14. The system as claimed in claim 1, wherein the set of spatial cells is further mapped to calibration data comprising a plurality of global positioning system coordinates.

15. The system as claimed in claim 14, arranged to generate said calibration data by detecting a known audio and/or visual signature associated with a calibration drone.

16. The system as claimed in claim 1, the set of cells is generated automatically.

17. The system as claimed in claim 1, wherein each of the at least one microphone array(s) and/or camera(s) is time synchronised.

18. The system as claimed in claim 17, wherein the time synchronisation is achieved by sending each microphone array and/or camera a timestamp generated by a central server.

19. The system as claimed in claim 1, wherein audio data from at least one microphone array is used to guide the analysis of video data from at least one camera.

20. The system as claimed in claim 1, wherein video data from at least one camera is used to guide the analysis of audio data from at least one microphone array.

21. The system as claimed in claim 1, wherein the image processing algorithm comprises:

calculating a mean frame from a subset of previously received video data frames;

subtracting said mean frame from subsequently received video data frames to generate a difference image; and comparing said difference image to a threshold within each visual spatial cell to generate the video analysis score.

22. The system as claimed in claim 1, wherein the library of audio signatures comprises a plurality of audio signatures associated with unmanned aerial vehicles in a plurality of scenarios.

23. The system as claimed in claim 1, wherein the audio analysis algorithm comprises classifying the detected unmanned aerial vehicle based on the closest match to an audio signature in said library.

24. The system as claimed in claim 1, wherein the image processing algorithm comprises classifying the detected unmanned aerial vehicle.

25. The system as claimed in claim 1, wherein the audio analysis algorithm comprises compensating for a predetermined source of noise proximate to the zone of interest.

26. The system as claimed in claim 25, wherein the audio analysis algorithm comprises compensating for the predetermined source of noise automatically.

27. The system as claimed in claim 1, wherein the audio analysis algorithm comprises a gradient algorithm, wherein the gradient algorithm is arranged to measure a relative change in a spatial audio distribution across one or more of the spatial cells.

28. The system as claimed in claim 1, wherein the processor is arranged to process said audio and visual data in a series of repeating timeframes such that it processes data for every spatial cell within each timeframe.

29. The system as claimed in claim 1, wherein the processor is arranged to analyse each spatial cell in parallel.

30. The system as claimed in claim 1, wherein the probability score is a total of the audio analysis score, the audio intensity score, and the video analysis score.

31. The system as claimed in claim 1, wherein the probability score is an average of the audio analysis score, the audio intensity score, and the video analysis score.

32. The system as claimed in claim 31, wherein the probability score is a weighted average of the audio analysis score, the audio intensity score, and the video analysis score.

33. The system as claimed in claim 1, wherein the probability score function is varied dynamically during a regular operation of the system.

* * * * *